(12) United States Patent
Yamada et al.

(10) Patent No.: US 6,415,313 B1
(45) Date of Patent: Jul. 2, 2002

(54) COMMUNICATION QUALITY CONTROL SYSTEM

(75) Inventors: Kenshin Yamada; Takafumi Sera; Akira Arutaki, all of Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/349,978

(22) Filed: Jul. 9, 1999

(30) Foreign Application Priority Data

Jul. 9, 1998 (JP) .......................................... 10-210387

(51) Int. Cl.[7] .............................................. G06F 15/16
(52) U.S. Cl. ........................ 709/200; 709/230; 709/232; 709/238; 370/332; 370/401; 370/466
(58) Field of Search ................................ 709/200, 203, 709/220, 227, 230, 232–235, 231, 238, 245, 249, 248, 250; 370/392, 401, 466, 352, 355, 397, 332; 713/201

(56) References Cited

U.S. PATENT DOCUMENTS

| 5,440,551 A | * | 8/1995 | Suzuki | .......................... 370/60 |
| 5,889,777 A | * | 3/1999 | Miyao et al. | ................ 370/345 |
| 6,034,963 A | * | 3/2000 | Minami et al. | ............. 370/401 |
| 6,103,713 A | * | 8/2000 | Nagami et al. | ............. 370/392 |
| 6,320,875 B2 | * | 11/2001 | Katseff et al. | .............. 370/466 |

FOREIGN PATENT DOCUMENTS

| JP | 6-205038 | 7/1994 |
| JP | 9-116560 | 5/1997 |
| JP | 10-173724 | 6/1998 |

* cited by examiner

*Primary Examiner*—Ario Etienne
(74) *Attorney, Agent, or Firm*—Foley & Lardner

(57) ABSTRACT

A communication quality control system for deciding an optimum communication quality in a received datagram to transfer the datagram, in which not only a destination is decided according to the data of the protocol layer 3 and beneath included in the datagram, but also attribute information of communication is taken out by an attribute detecting unit, according to the information of the respective protocol layers 4, 5, 6, and 7 or one of them, and communication quality for sending the datagram is decided by a communication quality deciding unit and a connection communication quality control unit, according to the quality information of connection corresponding to the attribute information taken out.

33 Claims, 11 Drawing Sheets

CONNECTION COMMUNICATION QUALITY CONTROL UNIT 17

FIG. 5

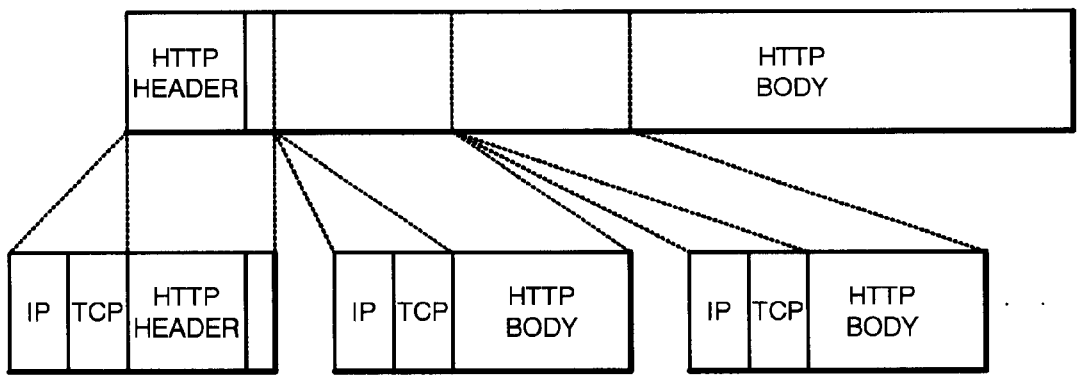

FIG. 6

```
1:bsdi % ftp -d ftpserver
2:Connected to ftpserver.
3:220 ftpserver FTP server (Version 5.60) ready.
4:Name (ftpserver:user1):
5:---> USER user1
6:331 Password required for user1
7:Password:
8:---> PASS XXXX
9:230 User user1 logged in.
10:ftp> get.test.dat
11:---> PORT 140,252,13,66,4,84
12:200 PORT command successful.
13:---> PETR test.dat
14:150 Opening BINARY mode data connection for test.dat (38 Kbytes).
15:226 Transfer complete.
16:38 Kbytes received in 3.5 seconds (11 Kbytes/s)
17:ftp>
```

FIG. 7
BASIC QOS TABLE

| Content-type (21) | DELAY PRIORITY (31) | LOSS PRIORITY (32) | BANDWIDTH (33) | CONNECTION PRIORITY (34) |
|---|---|---|---|---|
| image/* | 1 | 2 | MEDIUM | 1 |
| audio/* | 3 | 1 | SMALL | 1 |
| video/* | 3 | 2 | LARGE | 1 |
| OTHERS | 2 | 3 | MEDIUM | 2 |

FIG. 9
ROUTING TABLE

| DESTINATION SUBNET ADDRESS (43) | DESTINATION VPI (36-1) |
|---|---|
| IP SUBNET ADDRESS 1 | VPI 1 |
| IP SUBNET ADDRESS 2 | VPI 2 |
| IP SUBNET ADDRESS 3 | VPI 3 |
| IP SUBNET ADDRESS 4 | VPI 4 |

FIG. 8
EXTENDED QOS TABLE

| ITEM (50) | SOURCE IP (42) | DESTINATION IP (41) | Server (22) | User-Agent (23) | From (24) | Content-type (21) | DELAY PRIORITY (31) | LOSS PRIORITY (32) | BAND-WIDTH (33) | CONNECTION PRIORITY (34) | ADDITIONAL QUALITY (35) | DESTINATION VPI (36-2) |
|---|---|---|---|---|---|---|---|---|---|---|---|---|
| 1 | – | – | Server1 | – | – | – | 3 | +1 | +10% | 3 | – | – |
| 2 | – | – | – | Client1 | – | – | 4 | +1 | +20% | 3 | – | – |
| 3 | – | – | – | – | User1 | – | +1 | 3 | +20% | 4 | – | – |
| 4 | – | – | – | Client2 | User2 | video/* | 5 | 4 | +30% | 4 | – | – |
| 5 | IP ADDRESS 2 | – | Server2 | – | – | – | 3 | +1 | +10% | 3 | – | – |
| 6 | – | IP ADDRESS 1 | – | – | – | application/ x-newtype | 5 | 4 | LARGE | 4 | – | VP15 |
| 7 | IP ADDRESS 4 | IP ADDRESS 3 | – | – | – | text/* | 5 | 4 | LARGE | 4 | T2CP | VP16 |

SERVER INFORMATION CONTROL TABLE

| DESTINATION IP (41) | MEDIA ATTRIBUTE (51) | CHARACTER SET (52) | ENCODING METHOD (53) | LANGUAGE (54) |
|---|---|---|---|---|
| IP ADDRESS 1 | – | ISO-8859-1 | gzip compress | en, jp |
| IP ADDRESS 2 | – | US-ASCII | gzip compress | en |
| IP ADDRESS 3 | text/plain text/html | – | x | da |
| IP ADDRESS 4 | audio/basic image/jpeg | unicode-1-1 | – | – |

CONNECTION SETTING
AMONG COMMUNICATION QUALITY CONTROL SYSTEMS

CONNECTION SETTING PROCEDURE
WHEN THE CONNECTION-SETTING ROBUSTNESS=1

T: TIME

CONNECTION SETTING PROCEDURE
WHEN THE CONNECTION-SETTING ROBUSTNESS=2

T: TIME

CONNECTION SETTING PROCEDURE
WHEN THE CONNECTION-SETTING ROBUSTNESS=2

COMMUNICATION QUALITY CONTROL SYSTEM

BACKGROUNDS OF THE INVENTION

1. Field of the Invention

The present invention relates to a network communication system, and more particularly to a communication quality control system positioned on an existent data network over a datagram transfer network.

2. Description of the Related Art

In the conventional communication network, for example, in a LAN (Local Area Network), a datagram is transferred according to the upper layer protocol IP and further upper layer protocol TCP, based on the physical transfer technique such as Ethernet, ATM, or the like.

Also, in The Internet connecting IP subnets of LAN, various physical transfer methods including the above-mentioned Ethernet and ATM are considered and installed on systems.

In such a network, a system of relaying or transferring a datagram for assuring End-to-End communication, that is, a connection, which system is positioned within a communication network, is designed to realize a transfer function so that every system should satisfy the communication quality previously specified on a physical transfer layer of End-to-End protocol, in order to assure the End-to-End transfer quality.

In such an existent communication network, importance is attached especially to the layer 3 transfer such as IP, and a lot of systems, which are called routers, capable of transferring the IP layer chiefly are disposed within a network.

In such a router, the IP of the layer 3 is terminated, and a datagram is transferred, according to the destination IP address derived from the datagram, by deciding a path to which the datagram is transferred, from path information previously stored into the same system. At this time, in the processing of a physical layer to which the datagram is transferred, a path which is easily derived from the path information is selected and the datagram is transferred from the interface.

A network server capable of assuring communication quality in every application and transferring data between different subnets without using a router is disclosed in Japanese Patent Publication Laid-Open (Kokai) No. Heisei 9-116560.

In the above mentioned conventional router, it is impossible to determine the optimum communication quality according to connection quality depending on communication attributes of a datagram in transferring the datagram. This is why, a path to which a datagram is transferred is decided from path information previously stored into the same system, according to the destination IP address derived from the datagram, hence to transfer the datagram.

More specifically, there are the following problems.

First, it is impossible to transfer a datagram in the optimum communication quality in correspondence with the communication attributes such as a moving image, a voice, and an image.

Secondly, when providing some communication quality to a traffic used by a specified user or group, the user or group cannot be specified without using destination address and source address of an IP address.

Thirdly, it is impossible to ask an account depending on the quality of a connection determined by communication attributes.

Fourthly, since it is impossible to judge whether a datagram includes very important information on security or not, any datagram is transferred in the even communication quality, however it may include important information on security; therefore, it is impossible to realize datagram transfer depending on the security quality.

Fifthly, it is impossible to determine connection quality in accordance with the novelty of a datagram.

Sixthly, it is impossible to dynamically change the communication quality of a connection which is defined in a transport layer, while judging the state of the connection.

SUMMARY OF THE INVENTION

A first object of the present invention is to provide a communication quality control system capable of transferring a datagram in the optimum communication quality suitable for the derived communication attributes, as a result of deriving attributes of the datagram communication, while realizing high-speed datagram transfer of the layer 3 and beneath.

A second object of the present invention is to provide a communication quality control system capable of realizing various advanced communication services for a user previously registered, and demanding an account depending on communication quality.

A third object of the present invention is to provide a communication quality control system capable of judging whether a datagram includes very important data on security or not and realizing data transfer according to the security quality corresponding to the datagram.

A fourth object of the present invention is to provide a communication quality control system capable of transferring a datagram in the optimum communication quality, by determining the quality of a connection while judging the novelty of a datagram and by determining the connection quality based on not only the information recognized in the same connection but also the information recognized in the other connection.

According to one aspect of the invention, a communication quality control system for realizing an optimum datagram transfer function for connection quality corresponding to attributes of communication, comprises network end systems for respectively terminating a protocol layer of an existent data network, protocol end systems for respectively terminating the protocol layer 3 and beneath based on quality of communication of a received datagram, and a communication datagram transfer system for transferring the datagram to a specified end system according to quality information of a connection corresponding to communication attributes of the protocol layer 3 and beneath and communication attributes derived from the information on the respective protocol layers 4, 5, 6, and 7 or one of them included in a datagram received by an arbitrary end system, the communication datagram transfer system comprising attribute detecting means of checking identifying information included in the information of the protocol layer 3 and beneath of a datagram received by some end system and simultaneously checking identifying information included in the information of the respective protocol layers 4, 5, 6, and 7 or one of them, hence to take out the communication attribute information of the respective protocol layers, and communication quality deciding means for, when a datagram is received by a protocol end system, deciding communication quality for sending the datagram according to a set of the communication attribute information of the respective protocol layers derived from the datagram and the quality information of a connection, and notifying the communication quality to the protocol end system.

In the preferred construction, the attribute detecting means identifies the layer information, from the received datagram, as well as the state of a connection from the connection identifying information of a datagram, so to supply the result to the communication quality deciding means as connection information, and decides a transfer path of the datagram, so to supply the transfer path to the communication quality deciding means as destination path information: and the communication quality deciding means decides quality information of a connection corresponding to the attribute information and decides communication quality for sending a datagram according to the connection information, the quality information of the connection, and the destination path information, and takes out attribute information of communication according to the layer information and one or all of the datagram when it is judged that attributes of the layer 4 and upper need to be detected from the identified state of a connection.

In another preferred construction, the attribute detecting means identifies the layer information, from the received datagram, as well as the state of a connection from the connection identifying information of a datagram, so to supply the result to the communication quality deciding means as connection information, and decides a transfer path of the datagram, so to supply the transfer path to the communication quality deciding means as destination path information, the communication quality deciding means decides quality information of a connection corresponding to the attribute information and decides communication quality for sending a datagram according to the connection information, the quality information of the connection, and the destination path information, the communication datagram transfer system includes a connection/communication quality table in which a set of connection information and communication quality is registered, and the communication quality deciding means judges whether the datagram needs to be controlled by the connection-communication quality table when receiving the connection information and the destination path information, or the connection quality information, checks the presence of the same connection in the connection/communication quality table when the datagram needs to be controlled, and when there is the same connection, the means decides communication quality referring to the connection/communication quality table, while when there is not, the means decides communication quality, according to the connection information, the quality information of a connection, and the destination path information, and stores a set of the connection information and the communication quality into the connection/communication quality table, and decides communication quality according to the connection information and the destination path information when the datagram doesn't need to be controlled.

In another preferred construction, a database for storing the connection quality information corresponding to the attribute information is provided, the communication quality deciding means decides the connection quality information, according to the attribute information, referring to the database.

In another preferred construction, assuming that the layer 3 is an IP, the layer 4 is a TCP, and the layer 5 is an HTTP, the attribute detecting means checks protocol number of the IP header of the datagram, or the same protocol number and port address within the TCP protocol header of the datagram, or header value next to the IP header of the datagram, or the next header value and port address of the TCP protocol header of the datagram, and knowing that the layer 5 is the HTTP, checks one or some identifying information included in the TCP header, or the TCP header and an HTTP message of the received datagram, and when the datagram is transferred to a protocol end system, the communication quality deciding means decides quality of a connection of the layer 3 and beneath suitable for a connection derived from the datagram and performs datagram transfer processing based on the quality of the connection, hence to change the connection quality of a datagram to be transferred, so to do a transfer control.

In the above-mentioned construction, the attribute detecting means checks at least one of the following items: the media attribute of the datagram, from the Content type included in the HTTP header of a received datagram; E-mail address of a user who sent a datagram, from the From field included in the HTTP header; a user program name and the Version in which the datagram was created, from the User-Agent included in the HTTP header; and a server software name and the Version in which the datagram was created, from the Server included in the HTTP header, as the identifying information.

In the above-mentioned construction, the attribute detecting means checks at least one of the following items: the created date of the datagram, from the Date included in the HTTP header of a received datagram; authentication information of the datagram and the encrypting method of the authentication information, from the Authorization included in the HTTP header; the valid date of the datagram, from the Expires included in the HTTP header, as the identifying information.

In the above-mentioned construction, the attribute detecting means checks at least one of the following items: the required items of the datagram, from the Pragma included in the HTTP header of a received datagram; cache control information of the datagram, from the Cache-Control included in the HTTP header; execution requirements of the Method, from the If-Modified-Since included in the HTTP header; execution requirements of the Method, from the If-Unmodified-Since included in the HTTP header; a URI required by a client, from the request URI within a request line (Request-Line) included in the HTTP header; and the final updating time of the HTTP data, from the Last-Modified included in the HTTP header, as the identifying information.

In the above-mentioned construction, the attribute detecting means checks at least one of the following items: a referred URI (Uniform Resource Identifiers) of the HTTP data, from the Referer included in the HTTP header of a received datagram; a URI in which the HTTP data is located, from the Location included in the HTTP header; a destination URI and source domain name of the datagram, from the Forwarded included in the HTTP header; the base URI of the datagram, from the Content-Base included in the HTTP header; a URI in which the HTTP data is located, from the Content-Location included in the HTTP header; a method of requiring HTTP data from a user program, from the Method included in the HTTP header, as the identifying information.

In the above-mentioned construction, the attribute detecting means checks at least one of the following items: the Version in which the datagram is MIME (Multipurpose Internet Mail Extensions), from the MIME-Version included in the HTTP header of a received datagram; the media attribute a user program permits, from the Accept included in the HTTP header; a character set a user program permits, from the Accept-Charset included in the HTTP header; a coding method of datagrams a user program permits, from the Accept-Encoding included in the HTTP header; a datagram language a user program permits, from the Accept-Language included in the HTTP header; an encoding method of datagrams, from the Content-Encoding included in the HTTP header; and a datagram language, from the Content-Language included in the HTTP, as the identifying information.

In the above-mentioned construction, the attribute detecting means checks at least one of the following items: response content of a server replying to a request from a user program, from the Status Code included in the HTTP header of a received datagram; authentication information required by a server, from the WWW-Authenticate included in the HTTP header; authentication information required by a proxy server, from the Proxy-Authenticate included in the HTTP header; authentication information of the datagram, from the Proxy-Authorization included in the HTTP header, as the identifying information.

In the above-mentioned construction, the attribute detecting means checks at least one of the following items: the Method the HTTP data permits, from Allow included in the HTTP header of a received datagram; the Range requiring method a server permits, from the Accept-Range included in the HTTP header; a host and its port number that requires the HTTP data, from the Host included in the HTTP header; HTTP data getting requirements, from the If-Range included in the HTTP header; the Method a server permits, from the Public included in the HTTP header; and the Range of the HTTP data a user program requires, from the Range included in the HTTP header, as the identifying information.

In the above-mentioned construction, the attribute detecting means checks at least one of the following items: data length of the datagram, from the Content-Length included in the HTTP header of a received datagram; connection state of the datagram, from the Connection included in the HTTP header; reply information of a server replying to a request of a user program, from the Warning included in the HTTP header; possible date of obtaining the required HTTP data, from the Retry-After included in the HTTP header; the protocol Version, host name and using software name of a gateway or a proxy server relaying packets, from the Via included in the HTTP header; and a coding method of datagrams, from the Transfer-Encoding included in the HTTP header, as the identifying information.

In another preferred construction, assuming that the layer 3 is an IP, the layer 4 is a TCP or UDP (User Datagram Protocol), the attribute detecting means checks protocol number of the IP header of the datagram or the header value next to the IP header, and knowing that the layer 4 is the TCP or UDP, checks one or some identifying information included in the TCP header or UDP header of the received data as the identifying information, and when the datagram is transferred to a protocol end system, the communication quality deciding means decides quality of a connection of the layer 3 and beneath suitable for a connection derived from the datagram and performs datagram transfer processing based on the quality of the connection, hence to change the connection quality of a datagram to be transferred, so to do a transfer control.

In the above-mentioned construction, the attributed detecting means checks the "checksum" field included in the UDP header of the received datagram, as the identifying information.

In another preferred construction, assuming that the layer 3 is an IP, the layer 4 is a TCP or UDP, and the layer 5 is a DNS or TFTP or SNMP, the attribute detecting means checks protocol number of the IP header of the datagram, or the same protocol number and port address within the TCP or UDP protocol header of the datagram, or header value next to the IP header of the datagram, or the next header value and port address of the TCP or UDP protocol header of the datagram, and knowing that the layer 5 is the DNS or TFTP or SNMP, checks one or some identifying information included in the DNS message, the DNS message and the TCP or UDP header, the TFTP message, the UDP header and the TFTP message, the SNMP message, or the UDP header and the SNMP message of the received data as the identifying information, and when the datagram is transferred to a protocol end system, the communication quality deciding means decides quality of a connection of the layer 3 and beneath suitable for a connection derived from the datagram and performs datagram transfer processing based on the quality of the connection, hence to change the connection quality of a datagram to be transferred, so to do a transfer control.

In the above-mentioned construction, the attribute detecting means checks the presence of the "query type" in the DNS message of the received datagram, as the identifying information.

In the above-mentioned construction, the attribute detecting means checks "opcode" included in the TFTP message of the received datagram as the identifying information.

In the above-mentioned construction, the attribute detecting means checks the PDU type included in the SNMP message of the received datagram as the identifying information.

In another preferred construction, assuming that the layer 3 is an IP, the layer 4 is a TCP, and the layer 5 is an FTP or SNMP, the attribute detecting means checks protocol number of the IP header of the datagram, or the same protocol number and port address within the TCP protocol header of the datagram, or header value next to the IP header of the datagram, or the next header value and port address of the TCP protocol header of the datagram, and knowing that the layer 5 is the FTP or SMTP, checks one or some identifying information included in the FTP Command, the FTP Reply, the TCP header and the FTP Command or FTP Reply, the SMTP Command, SMTP Reply Code, the SMTP header, the TCP header and the SMTP Command or SMTP Reply Code or the SMTP header of the received data as the identifying information, and when the datagram is transferred to a protocol end system, the communication quality deciding means decides quality of a connection of the layer 3 and beneath suitable for a connection derived from the datagram and performs datagram transfer processing based on the quality of the connection, hence to change the connection quality of a datagram to be transferred, so to do a transfer control.

In another preferred construction, a physical layer of transfer is of the ATM transfer method, individual VCs (Virtual Circuit) are assigned to the respective connection qualities of ATM as the datagram transfer processing according to each connection quality so to transfer datagrams, and parameters for communication quality control depending on the connection qualities are set to the respective VCs, thereby performing transfer depending on the attribute of media derived from a datagram.

In another preferred construction, the communication quality deciding means sets connection-setting robustness selectively depending on a connection-setting message for setting a connection, in addition to the above communication qualities.

In another preferred construction, the communication quality deciding means decides at least one of a control parameter relative to an optimum bandwidth, an optimum control parameter relative to delay time including the maximum delay time and the delay time fluctuation amount, an optimum control parameter relative to data loss including buffer amount, a control parameter relative to the optimum accounting information, and a control parameter relative to the optimum security quality, as the communication quality of the connection.

In another preferred construction, the communication quality deciding means decides at least one of the optimum destination of a datagram and the optimum destination path of a datagram, according to the communication quality of the connection.

In another preferred construction, the communication quality deciding means, according to the communication quality of the connection, transfers the datagram after coding or encoding the same, by use of a physical line of the exclusive use for the connection if necessary, deletes unnecessary information within the datagram, decreases the size of the datagram by compression, and performs tunneling of the datagram.

In another preferred construction, the communication quality deciding means sets connection-setting priority or connection-transfer priority, as the communication quality of connection, according to the attribute information, and connection-setting processing having the higher connection-setting priority is preferentially executed and a datagram of a connection having the higher connection-transfer priority is preferentially transferred.

According to another aspect of the invention, a communication quality control system for realizing an optimum datagram transfer function for connection quality corresponding to attributes of communication, comprises
  network end systems for respectively terminating a protocol layer of an existent data network;
  protocol end systems for respectively terminating the protocol layer 3 and beneath based on quality of communication of a received datagram; and
  a communication datagram transfer system for transferring the datagram to a specified end system according to quality information of a connection corresponding to communication attributes derived from the information of the respective protocol layers 4, 5, 6, and 7 or one of them included in a datagram received by an arbitrary end system,
  the communication datagram transfer system including
  attribute detecting means of checking identifying information included in the information of the respective protocol layers 4, 5, 6, and 7 or one of them included in a datagram received by an arbitrary end system, hence to take out the communication attribute information of the respective protocol layers, and
  communication quality deciding means for, when a datagram is received by a protocol end system, deciding communication quality for sending the datagram according to a set of the communication attribute information of the respective protocol layers derived from the datagram and the quality information of connection, and notifying the communication quality to the protocol end system.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 5 is a view showing an example in the case of dividing HTTP sessions into IP datagrams;

FIG. 6 is a view showing an example of file transfer according to FTP;

FIG. 7 is a view for use in describing an example of a basic QOS table within a QOS database;

FIG. 8 is a view for use in describing an example of an extended QOS table within a QOS database;

FIG. 9 is a view for use in describing an example of a patch table;

DESCRIPTION OF THE PREFERRED EMBODIMENT

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Description of Constitution

Preferred embodiments of the present invention will be described in detail with reference to the drawings.

Figure 1:
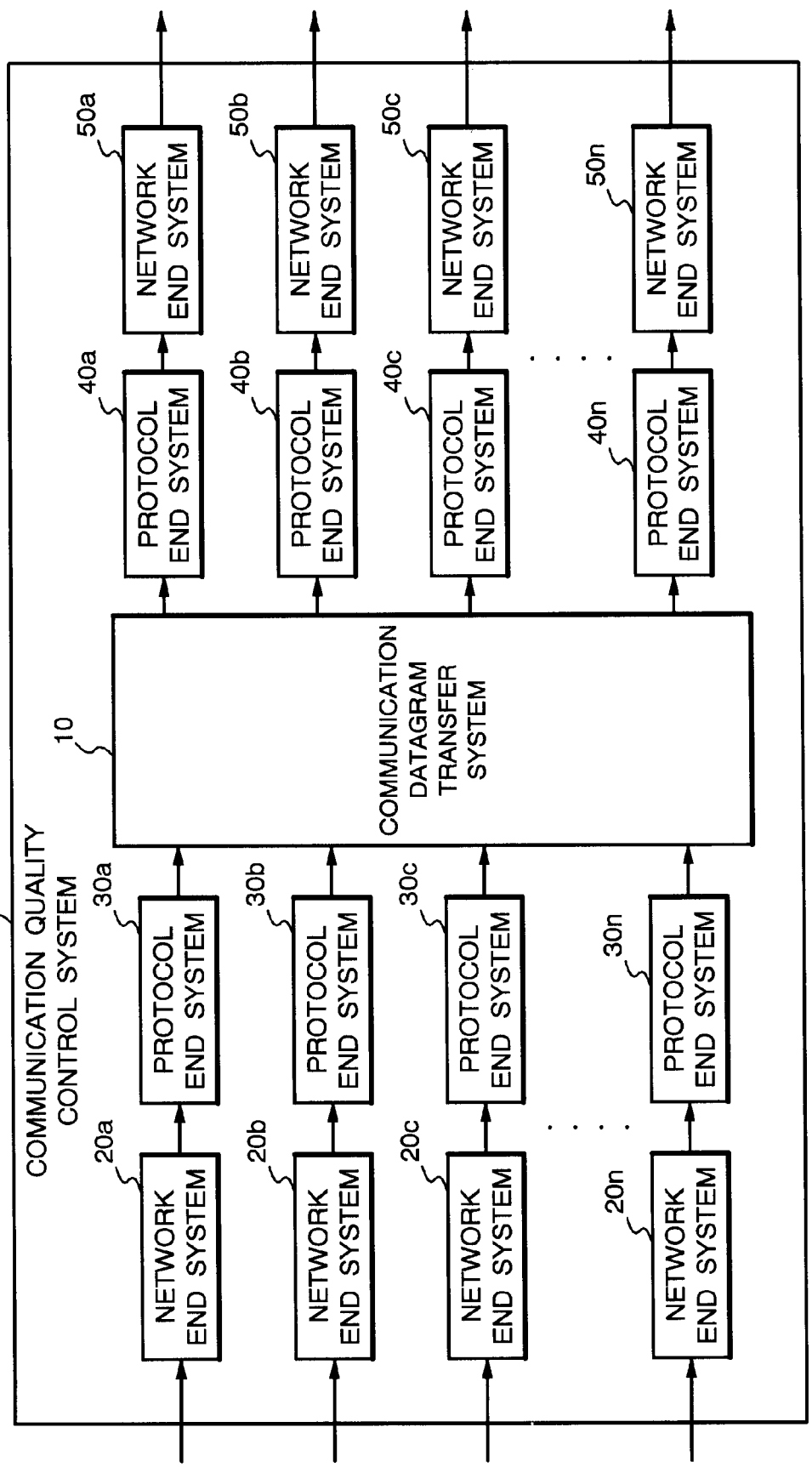
FIG. 1 is a block diagram showing a constitution example of a communication quality control system according to an embodiment of the present invention.

FIG. 1 is a block diagram of a communication quality control system 60, indicating a first embodiment of the present invention. The communication quality control system 60 of this embodiment comprises a plurality of sets of network end systems 20a, 20b, 20c, ..., 20n and 50a, 50b, 50c, ..., 50n and protocol end systems 30a, 30b, 30c, ..., 30n and 40a, 40b, 40c, ..., 40n, and a communication datagram transfer system 10 for connecting each protocol end system.

Each network end system 20a, 20b, 20c, ..., 20n terminates a protocol layer of a data network as for a received datagram. The protocol layer of a data network specifically means a MAC layer, an ATM layer, and the like. The protocol end system 30a terminates the layer 3 and beneath such as an IP layer according to the communication quality of a datagram to be transferred from the network end system 20a. Similarly, each protocol end system 30b, 30c, ..., 30n terminates the layer 3 and beneath such as an IP layer according to the communication quality of a datagram to be transferred from each network end system 20b, 20c, ..., 20n.

The communication datagram transfer system 10 transfers a datagram to one of the protocol end systems 40a, 40b, 40c, ..., 40n according to the quality information of connection corresponding to communication attributes derived from the information of the respective protocol layers 4, 5, 6, 7 or one of them included in the datagram received from the protocol end system 30a, 30b, 30c, ..., or 30n. The datagram transfer system 10 determines communication quality for sending a datagram according to the quality information of connection and notifies it to the corresponding protocol end system 40a, 40b, 40c, ..., or 40n.

The protocol end system 40a, upon receipt of a datagram and communication quality for sending the datagram from the communication datagram transfer system 10, sets the protocol layer 3 and less based on the notified communication quality, and transfers the same to the network end system 50a. The network end system 50a transfers the datagram to an outside network. Similarly, each protocol end system 40b, 40c, ..., 40n, upon receipt of a datagram and communication quality for sending the datagram from the communication datagram transfer system 10, sets the protocol layer 3 and beneath based on the notified communication quality, and transfers the same to each network end system 50b, 50c, ..., 50n, and each network end system 50b, 50c, ..., 50n transfers the corresponding datagram to an outside network.

Although the communication quality control system 60 consists of a plurality of protocol end systems logically, all the protocol end systems or some protocol end systems may be constituted physically by the same hardware. Similarly, although the communication quality control system 10 consists of a plurality of network end systems logically, all the network end systems or some of them may be constituted physically by the same hardware. To take a concrete example, since the ATM communication extends a path to a virtual destination in every VP (Virtual Path), logically one network end system terminates each VP; however, one end system for terminating one physical line may terminate a plurality of VPs physically in some cases.

Logically, the protocol end systems 30a, 30b, 30c, ..., 30n on a sending side have sending functions and the protocol end system 50a, 50b, 50c, ..., 50n on a receiving side have receiving functions; however, the respective systems may be constituted physically by the same hardware. Similarly, the network end systems 20a, 20b, 20c, ..., 20n on a sending side have sending functions and the network end systems 40a, 40b, 40c, ..., 40n on a receiving side have receiving functions logically; however, the respective systems may be constituted physically by the same hardware.

Figure 2:
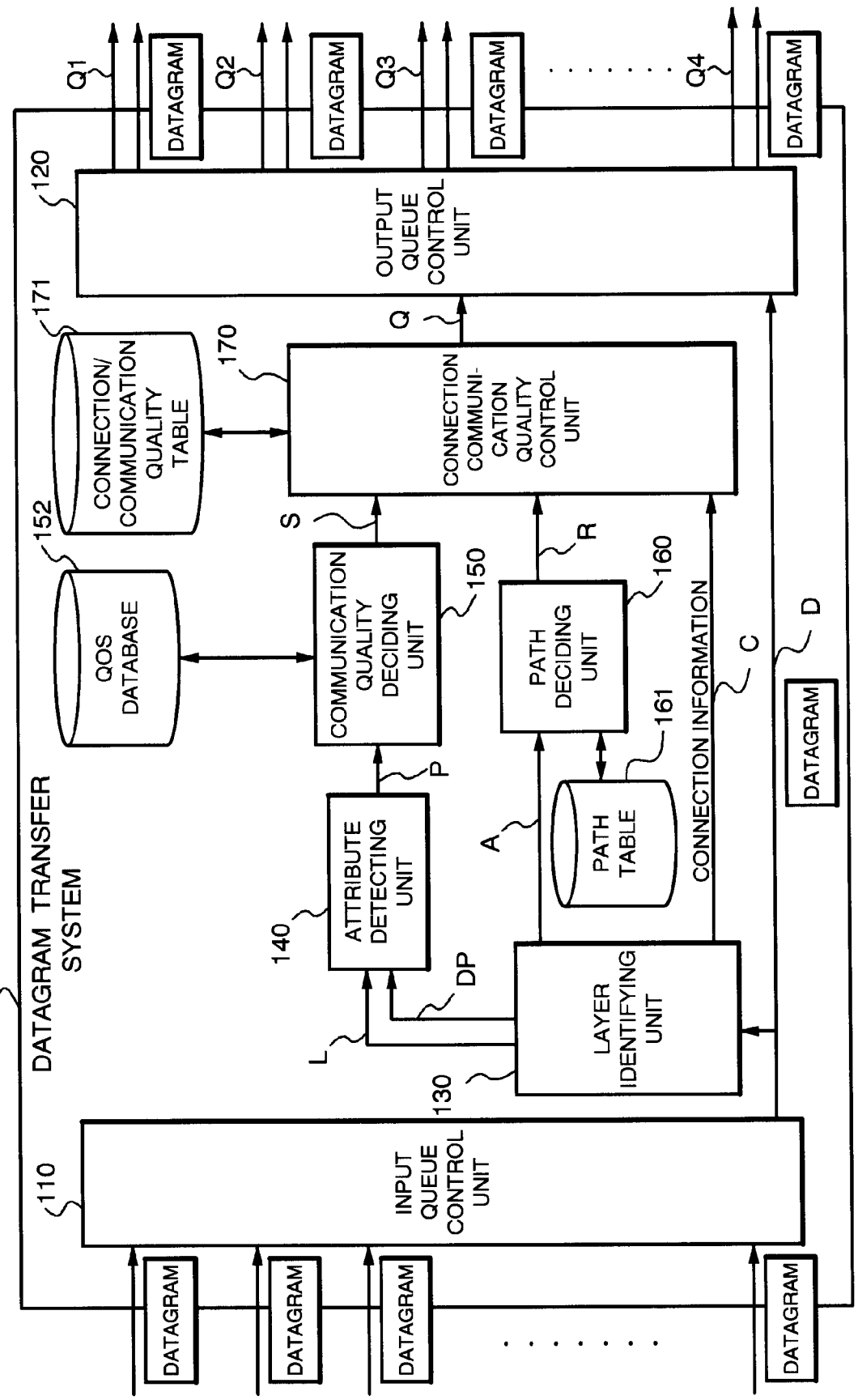
FIG. 2 is a block diagram showing a constitution example of a communication datagram transfer system according to the embodiment of the present invention.

FIG. 2 is a block diagram showing a constitution example of the above mentioned communication datagram transfer system 10.

The communication datagram transfer system 10 comprises an input queue control unit 110, an output queue control unit 120, a layer identifying unit 130, an attribute detecting unit 140, a communication quality deciding unit 150, a path deciding unit 160, a connection communication quality control unit 170, a QOS database 152, a path table 161, and a connection/communication quality table 171.

The input queue control unit 110, upon receipt of datagrams from the respective protocol end systems 30a, 30b, 30c, ..., 30n, selects a datagram having the highest priority and supplies the datagram (D) to the layer identifying unit 130 and the output queue control unit 120.

Figure 3:
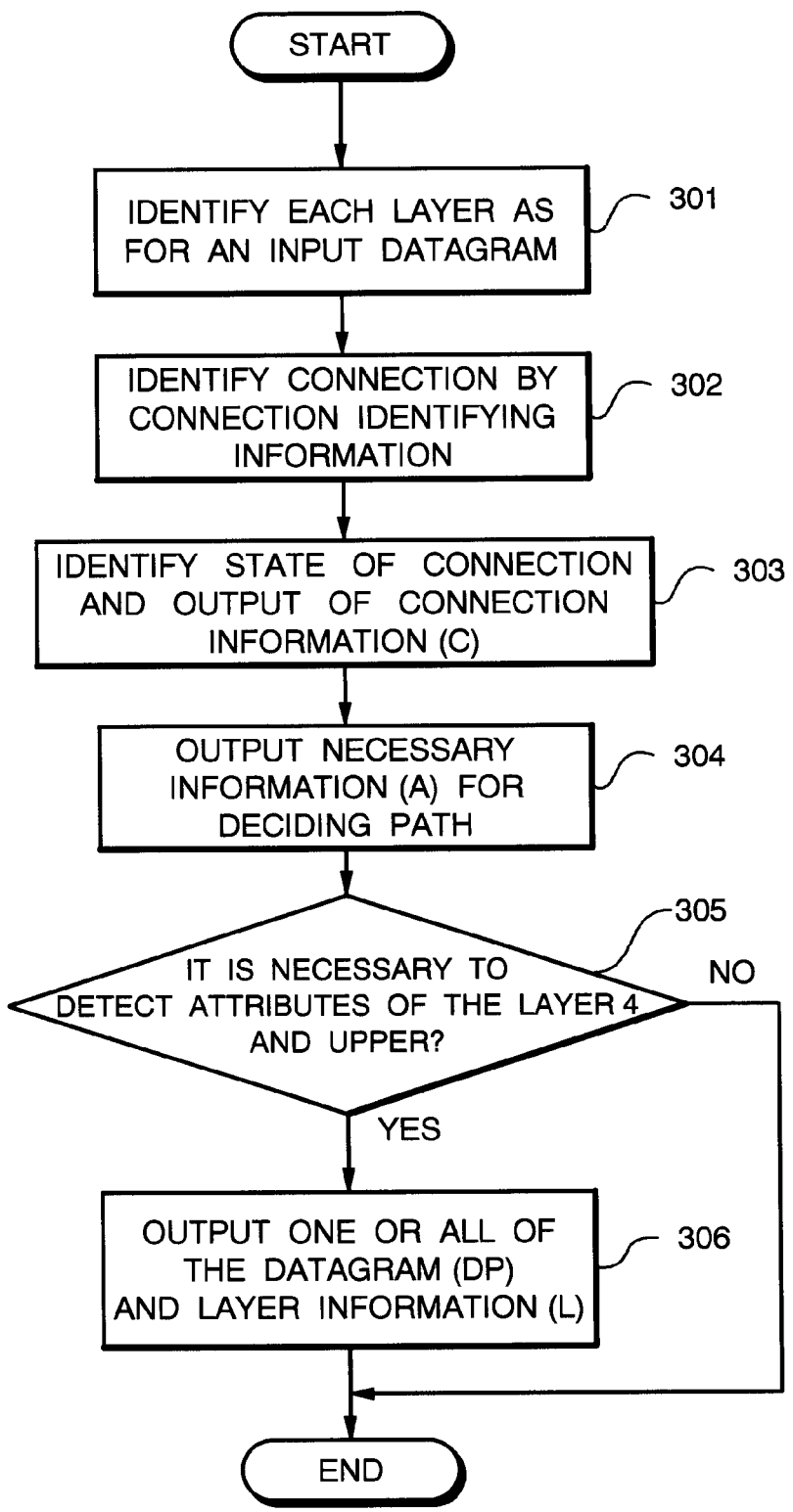
FIG. 3 is a flow chart for use in describing the operation of a layer identifying unit according to the embodiment of the present invention.

The layer identifying unit 130 operates according to the flow chart of FIG. 3. At first, the layer identifying unit 130 identifies the respective layers of the input datagram (D) (Step 301). Concretely, when the layer 3 is an IP, version of the IP is recognized from the version of the IP header, and when the layer 3 is the IPv4, the application thereof is recognized by reference to the protocol number of the IP header, or this protocol number and the port number of TCP or UDP protocol header of the datagram. When the layer 3 is the IPv6, the application thereof is recognized by reference to the next header value of the IP header, or the same next header value and the port number of the TCP or UDP protocol header.

The layer identifying unit 130 identifies a connection that is the unit of a traffic to determine communication quality out of the input datagram (D) (Step 302). Concretely, when the layer 3 is the IP and the layer 4 is a TCP or UDP, a connection is identified according to the connection identifying information including a set of sending IP address and destination IP address of the IP header and a set of sending port number and destination port number of the TCP or UDP header.

The layer identifying unit 130 identifies the state of the connection recognized according to the above mentioned connection identifying information and supplies both the connection identifying information and the connection state information, as the connection information (C), to the connection communication quality control unit 170 (Step 303). Identifying the state of a connection is; in the concrete, when the layer 4 is a TCP, establishment of a TCP connection is recognized by a SYN flag standing, and end of a TCP connection is recognized by a FIN flag standing, in a code bit within the TCP header.

The layer identifying unit 130 supplies information (A) necessary for deciding a path, to the path deciding unit 160 (Step 304).

The layer identifying unit 130 judges whether it is necessary to detect attributes of the layer 4 and upper in the attribute detecting unit 140, based on the identified connection state (Step 305).

When the unit 130 judges that it is necessary to detect the attributes of the layer 4 and upper, it supplies the layer information (L) of the datagram and some or all of the datagram (DP) necessary for the attribute detecting unit 140 to detect attributes from the respective layers, to the attribute detecting unit 140 (Step 306). It is, for example, in the case of receiving a datagram of a front session, in the HTTP sessions, in other words, receiving a datagram including an HTTP header that the attribute detecting unit 140 need to detect attributes of the layer 4 and upper.

The attribute detecting unit 140 detects attribute information of communication from some or all of the datagram (DP) entered based on the layer information (L) entered from the layer identifying unit 130, and supplies the detected attribute information (P) of the communication to the communication quality deciding unit 150.

Although detecting identifying information included in the respective layers 4, 5, 6, 7 of a datagram, or one of them, the attribute detecting unit 140 is to detect information of the layer 3 and beneath if it is necessary to define the quality of a connection.

The communication quality deciding unit 150 retrieves quality information (S) of a connection corresponding to the attribute information (P) of the communication entered from the attribute detecting unit 140, referring to the QOS database 152, and supplies the same to the connection communication quality control unit 170.

The path deciding unit 160 retrieves the path table 161, by the necessary information (A) for deciding a path received from the layer identifying unit 130, so to decide a destination path of the datagram, and supplies the destination path information (R) of the datagram to the connection communication quality control unit 170.

Concretely, when the layer is an IP, the necessary information (A) for deciding a path is a destination IP address. An IP subnet address coming under the destination IP address or the destination IP address itself is retrieved by use of the destination IP address as a key, so to decide VPI (Virtual Path Identifier) or IP address of the next destination system corresponding to the IP subnet address.

Figure 4:
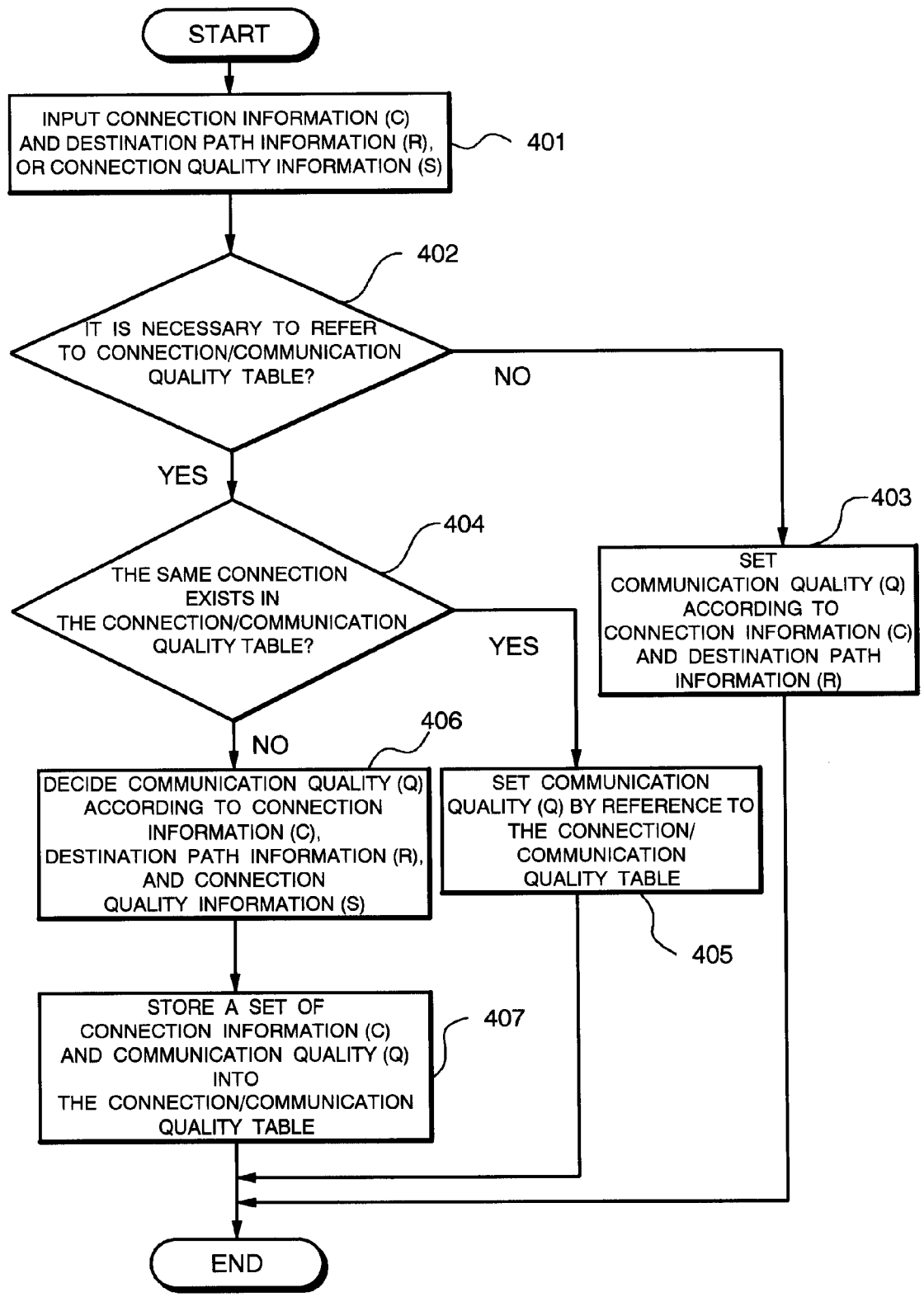
FIG. 4 is a flow chart for use in describing the operation of a connection communication quality control unit according to the embodiment of the present invention.

The connection communication quality control unit 170 operates according to the flow chart of FIG. 4. The connection communication quality control unit 170 receives connection information (C) from the layer identifying unit 130 and destination path information (R) from the path deciding unit 160, or connection quality information (S) from the communication quality deciding unit 150 (Step 401).

The connection communication quality control unit 170 judges whether the datagram (D) needs to be controlled by the connection/communication quality table 171 or not; namely, whether it is the datagram (D) requiring referring to the connection/communication quality table, or the datagram (D) requiring storing into the same table (Step 402) according to the connection information (C) entered from the layer identifying unit 130.

When the datagram (D) does not need to be controlled by the connection/communication quality table 171, communication quality (Q) is decided, according to the connection information (C) entered from the layer identifying unit 130 and the destination path information (R) entered from the path deciding unit 160, and supplied to the output queue control unit 120 (Step 403).

When the datagram (D) needs to be controlled by the connection/communication quality table 171, the connection communication quality control unit 170 retrieves the connection/communication quality table 171 to check whether there exists the same connection or not (Step 404).

When there exists the same connection as a result of the retrieval of the connection/communication quality table 171, communication quality (Q) is established by reference to the connection/communication quality table 171 (Step 405).

When there exists no same connection as a result of the retrieval of the connection/communication quality table 171, communication quality (Q) for transferring the datagram (D) is decided, according to the quality information (S) of the connection entered from the communication quality deciding unit 150, the connection information (C) entered from the layer identifying unit 130, the destination path information (R) entered from the path deciding unit 160 and supplied to the output queue control unit 120 (Step 406). At this time, the connection communication quality control unit 170 stores a set of the connection information (C) and the communication quality (S) into the connection/communication quality table 171 (Step 407).

It is only in the case of judging the layer identifying unit 130 needs to identify attributes of the layer 4 and upper that the connection quality information (S) is entered into the connection communication quality control unit 170 from the communication quality deciding unit 150. When the connection quality information (S) is not entered there, it is judged that the datagram does not need to be controlled by the connection/communication quality table 171 and communication quality (Q) is decided, according to the connection information (C) entered from the layer identifying unit 130 and the destination path (R2) entered from the path deciding unit 160.

Even if the connection quality information (S) is entered there, it is to be judged whether the datagram needs to be controlled by the connection/communication quality table 171, and the datagram of the layer 4 and upper requiring no referring to the table 171 is not to be controlled by the connection/communication quality table 171. In this case, communication quality (Q) is also decided, according to the connection information (C) entered from the layer identifying unit 130 and the destination path (R2) entered from the path deciding unit 160.

When the layer identifying unit 130 judges that attribute information of the layer 4 and upper is required, such as in the case of receiving a datagram including an HTTP header in a connection including the HTTP sessions, connection quality (S) corresponding to the attribute information (P) examined in the attribute detecting unit 140 is entered into the connection communication quality control unit 170 from the communication quality deciding unit 150.

The connection communication quality control unit 170 stores a set of the connection information (C) and the communication quality (Q) into the connection/communication quality table 171. Once the communication quality (Q) corresponding to the connection quality (S) is decided, as for a datagram (D) judged to be of the same connection according to the connection information (C) entered from the layer identifying unit 130, communication quality (Q) based on the connection quality (S) corresponding to the attribute value of the layer 4 and upper is established, by reference to the connection/communication quality table 171, and supplied to the output queue control unit 120.

The output queue control unit 120 selects the optimum protocol end system; 40a, 40b, 40c, . . . , 40n, as for the datagram (D) entered from the input queue control unit 110, according to the communication quality (Q) entered from the connection communication quality control unit 170, and the datagram (D) and the communication quality (Q1, Q2, Q3, . . . , Qn) necessary for sending the datagram are transferred to the selected protocol end system.

The operation according to the embodiment of the present invention will be described in the case where the layer 3 is an IP, the layer 4 is a TCP, and the layer 5 is an HTTP.

In the case of receiving no connection quality information (S) and in the case of a datagram of the layer 4 and upper requiring no referring to a table, the connection communication quality control unit 170 decides communication quality (Q) for transferring the datagram (D) according to the connection information (C) and the destination path (R), by the default operation.

As illustrated in FIG. 5, the HTTP sessions (H0) is divided into some IP datagrams (H1, H2, H3, . . . ) and transferred over a network, and the datagram including an HTTP header considered to define the attribute of the communication in the HTTP sessions is a front datagram (H1).

Accordingly, the layer identifying unit 130 recognizes that, upon receipt of the front datagram (H1), it is the first datagram after a connection is established, while monitoring the code bit of the TCP header. The layer identifying unit 130 supplies the layer information (L) that the layer 5 is the HTTP, to the attribute detecting unit 140. The attribute detecting unit 140 detects attribute necessary for deciding communication quality from the HTTP header within the datagram (H1) and supplies the attribute information (P) to the communication quality deciding unit 150.

The communication quality deciding unit 150 retrieves the QOS database 152 according to the attribute information (P) entered from the attribute detecting unit 140, decides connection quality (S), and supplies the same to the connection communication quality control unit 170.

The connection communication quality control unit 170 judges that the datagram (H1) requires referring to the connection/communication quality table 171 and storing therein, decides the communication quality (Q) of the datagram (H1) according to the connection quality (S) entered from the communication quality deciding unit 150 and the destination path (R) entered from the path deciding unit 160, and supplies it to the output queue control unit 120.

The connection communication quality control unit 170 stores a set of the connection information (C) and the communication quality (Q) into the connection/communication quality table 171.

When receiving the datagram (H2), the connection communication quality control unit 170 retrieves the connection/communication quality table, according to the connection information (C) entered from the layer identifying unit 130, and transfer of the datagram is performed in the same communication quality as the datagram (H1).

As for the datagram (H3) and the later, the datagram transfer is performed in the same communication quality as the datagram (H1) similarly.

The communication datagram transfer system 10 of the present invention is to terminate the layer 3 and beneath of a datagram hence to do the datagram transfer, thereby providing a high speed operation similarly to the existent router. However, it is possible to examine communication attributes of the layer 4 and upper depending on the necessity and. transfer a datagram in the optimum communication quality corresponding to the communication attributes.

Embodiment 1

This time, more concrete description about the content of the attribute information (P) detected by the attribute detecting unit 140, the content of the connection quality (S) decided by the communication quality deciding unit 150 according to the attribute information (P), and what communication quality is provided according to the connection quality (S), will be made, by way of a concrete example of the communication datagram transfer system 10, in the case of transferring a datagram having an IPv4 as the layer 3, a TCP as the layer 4, an HTTP as the layer 5, with the ATM transfer method adopted to the transferring physical layer.

When receiving a datagram of the first HTTP session, the layer identifying unit 130 recognizes that the layer 4 is a TCP because of the protocol number of the IP header being 6 and that the layer 5 is an HTTP because of the port number of the TCP header being 80, and the unit 130 supplies the same to the attribute detecting unit 140 as the layer information.

The attribute detecting unit 140 checks the presence of Content-Type (21), Server (22), User-Agent (23), and From (24) in the HTTP header because the layer 5 is the HTTP. In the case of their existence, the unit 140 supplies the result to the communication quality deciding unit 150 together with the attribute values.

The Content-Type (21) defined by the RFC (Request For Comment) 1521 indicates the attribute of media, represented by a set of basic type/sub-type. For example, when the basic type is "image", the media is proved to be an image; when "video", it is proved to be a moving image; when "audio", it is proved to be a voice; when "text", it is proved to be text data; when "application", it is proved to be application data. The Server (23) indicates the program name and the version of a server replying to a request by the HTTP. The User-Agent (22) indicates the client program name and the version used by a user who requires data by the HTTP. The From (24) indicates E-mail address of a user who requires data by the HTTP.

The attribute detecting unit 140 detects destination IP address (41) and source IP address (42) from the IP header, in addition to the attributes detected from the HTTP header, as the attributes for deciding connection quality, and supplies the same to the communication quality deciding unit 150.

The communication quality deciding unit 150 retrieves the QOS database 152 according to the respective attributes entered from the attribute detecting unit 140. In this embodiment, a basic QOS table 150A of FIG. 7 and an extended QOS table 150B of FIG. 8 are used as the QOS database 152.

With reference to the basic QOS table 150A of FIG. 7, there are established, delay priority (31), loss priority (32), bandwidth (33), and connection priority (34), based on the attribute of the Content-Type (21).

The delay priority (31) means that a greater value would be preferentially transferred first. The loss priority (32) means that the cell loss would be more restrained in a greater value and that the data of small value would be abandoned preferentially in the event of a congestion. The connection priority (34) means that a connection would be preferentially established in a greater value.

In the example of FIG. 7, the value of the Content-type (21) is used to judge whether the media attribute is an image, a voice, a moving image, or other data. In the case of the voice and moving image media, the delay priority is set higher than the other media, thereby enabling real-time communication. As for the voice media, image media, moving image media, a little data loss is permitted, compared with the other data application; therefore, the loss priority (32) is set small.

With reference to the example of the extended QOS table 150B in FIG. 8, the delay priority (31), the loss priority (32), the bandwidth (33), the connection priority (34), the addition quality (35), and the destination VPI (36-2) are decided, based on the destination IP (41), the source IP (42), the Content-Type (21), the Server (22), the User-Agent (23), and the From (24).

Each definition of the delay priority (31), the loss priority (32), the bandwidth (33), and the connection priority (34) is the same as that of the above mentioned basic QOS table 150A; however, their attribute values can be set by the difference from the values set in the basic QOS table 150A. For example, referring to the case in which the item number (50) is "1", when the Server (22) entered from the attribute detecting unit 140 has the program name "Server1", the loss priority (31) is set at "+1" added to the value defined in the basic QOS table 150A, and the bandwidth (33) is set at "+10%" of the value defined in the basic QOS table 150A.

Similarly, it is possible to set the optimum parameters based on the contract with a user using the communication quality control system, by changing the respective connection qualities (31, 32, 33, 34), according to the client name defined in the User-Agent (23) and E-mail address of a user defined in the From (24). When the item number (50) is "4", and a user having E-mail address "User2" establishes communication of a moving image by use of a program "client2", the delay priority (31), the loss priority (32), and the connection priority (34) are set high and the bandwidth (33) is set 30% more than usual, thereby realizing moving image communication of higher quality.

When the item number (50) is "5" and a user having IP address2 as the source IP (42) establishes communication with a server program "Server2", connection qualities described in FIG. 8 are set. Thus, connection qualities are decided by using not only the attribute information on the layer 4 and upper, but also the attribute information on the layer 3 and beneath if necessary.

The destination VPI (42) is to decide the destination of a datagram.

The destination of a datagram is basically decided by reference to the path table 161 in the path deciding unit 160. FIG. 9 shows the example of the path table 161. With reference to FIG. 9, the path table 161 consists of a set of a destination subnet address (43) and a destination VPI (36-1). The path deciding unit 160 examines which subnet address (43) within the path table 161 includes the destination IP address (41) entered from the layer identifying unit 130 and decides the corresponding destination VPI (36-1).

In the item number 6 of the extended QOS table 150B, when the destination IP address (41) is IP address1 and the Content-Type (21) uses application/x-newtype, the destination VPI (42) is set at VPI5. Accordingly, when the destination VPI (36-2) is set in the connection quality (S) entered from the communication quality deciding unit 150, the connection communication quality control unit 170 gives priority to it over the destination VPI (36-1) supplied from the path deciding unit. Thus, the communication quality deciding unit 150 is enabled to decide the destination VPI (36) and provided with a function of giving priority to the destination VPI (36-2) decided by the communication quality deciding unit 150 over the destination VPI (36-1) decided by the path deciding unit 160, which makes it possible to change the type of a using application, a using transfer path or a destination depending on a user.

The addition quality (35) defines an encrypting method of a datagram for assuring data transfer corresponding to the security quality as the connection quality. The item number 7 of FIG. 8 shows that the encryption of a datagram and the tunneling thereof are performed by use of the L2TP (Layer 2 Tunneling Protocol) in the communication of text data from the IP address 4 to the IP address 3.

In the extended QOS table 150B of FIG. 8, the connection quality is decided by judging whether the source IP (42) and the destination IP (41) are coincident with the written IP address. Alternatively, it is possible to decide the connection quality at the level of subnet, by writing an IP subnet address therein and judging whether the source IP (42) and the destination IP (41) belong to the IP subnet address.

The connection communication quality control unit 170 decides the delay priority (31), the loss priority (32), the bandwidth (33), the connection priority (34), the addition quality (35), and the destination VPI (36-2), as the connection qualities (S) entered from the communication quality deciding unit 150, and the VPI and VCI as the communication quality (Q) for sending a datagram according to the destination VPI (36-1) entered from the path deciding unit 160, and supplies the result to the output queue control unit 120.

The output queue control unit 120 selects the optimum protocol end system according to the path decided by the VPI and the quality decided by the VCI to transfer a datagram.

The output queue control unit 120 processes a datagram having the highest delay priority (31) preferentially.

The output queue control unit 120 provides a datagram having the higher loss priority (32) with more buffer amount, thereby performing a control so as to abandon a datagram having the lower loss priority (32) in the event of a congestion.

When the connection communication quality control unit 170 detects a new connection, or when the communication quality of a connection is changed, a VC (Virtual Circuit) is set between another ATM and itself depending on the necessity. Connection setting is preferentially performed on a datagram having the higher connection priority (34) in assigning the VC (Virtual Circuit) thereto.

The following setting will be concretely performed.

(1) When it is necessary to perform the VC setting on the both datagram having the higher connection priority (34) and the datagram having the lower connection priority (34), the VC setting for the connection having the higher connection priority (34) is firstly performed.

(2) When it is impossible to perform the VC setting of a datagram having the higher connection priority (34), the VC of the lower connection priority (34) is released and the VC setting of a datagram having the higher connection priority (34) is performed.

(3) When the VC resources are becoming short, the VC of the lower connection priority (34) is released before exhausting the resources.

As for some VPIs of the destination VPIs (36), it is possible to enhance the security quality by setting a path using a physical line for the exclusive use. For example, by assigning the VPI6 of the destination VPI (36-2) as the physical line for the exclusive use, the physical line of the exclusive use is assigned to the data having IP address 4 as the source IP (42), IP address 3 as the destination IP (41), and "text" as the Content-Type (21), in the item number 7 of the extended QOS table 150B of FIG. 8, thereby enabling datagram transfer having the higher security quality.

In this embodiment, although a plurality of attributes are examined from the HTTP header and the IP header, and the connection quality is decided, by use of the basic QOS table 150A and the extended QOS table 150B as the QOS database 152, it is also possible to do so only by use of the basic QOS table 150A. In this case, the connection quality is decided by the Content-Type within the HTTP header.

Embodiment 2

The description will be made in the case of accounting, in the communication datagram transfer system of the present invention. Accounting is controlled by the unit of VC connection in the connection communication quality control unit 170. The accounting amount is decided by "traffic amount×basic account amount". The traffic amount is counted by the number of packets passing in every VC connection, the number of transferred words, the number of transferred bytes, or the number of the total bits. The basic accounting amount is assumed to be decided depending on the connection quality of a VC connection.

For example, it can be set as the setting priority (31)× weight 1+loss rate (32)×weight 2+bandwidth (33)×weight 3+connection priority (35)×weight 4+addition service amount. The addition service amount means the additional fee in the case of adopting, for example, the tunneling algorithm such as L2TP to a connection.

A user to be billed is identified by the source IP address, the destination IP address, and the like in the case of using the information of the layer 3 and beneath. In the case of using the information of the layer 4 and upper, however, a user and/or a group can be specified from a user E-mail address, a using server program name, a client program name, an application name, and the like, by examining, for example, the From, Server, User-Agent, and Content-Type in the HTTP header.

Embodiment 3

The attribute detecting unit 140 checks the presence of Date field newly, in addition to the HTTP header checked in the embodiment 1, and when there exists the Date field, it supplies the same to the communication quality deciding unit 150 together with the attribute value thereof. Use of the Date field obtains the transmission time of a datagram.

The communication quality deciding unit 150 checks the Date field, and when the time elapsed longer than the established threshold, the cell loss priority is set at the minimum 0, or the datagram is immediately abandoned.

According to the above control, lower-valued data such that the time elapsed longer after the data creation can be abandoned preferentially.

When the Content-Type is "audio" or "video", the communication quality deciding unit 150 checks the Date field, and when the time elapsed longer than the established threshold, the cell loss priority is set at the minimum 0, or the datagram is controlled to be abandoned immediately, thereby enabling a control of abandoning the lower-valued data such that the time elapsed longer after the data creation preferentially, as for a real-time application.

Embodiment 4

The attribute detecting unit 140 checks the presence of the Authorization header field or the Proxy-Authorization header field, in addition to the HTTP header checked in the embodiment 1 or 3, and supplies the presence or absence to the communication quality deciding unit 150. It can be judged whether a datagram includes authentication information or not, from the Authorization header filed or the Proxy-Authorization header field.

When detecting the presence of the Authorization header field or the Proxy-Authorization header field, the communication quality deciding unit 150 sets the loss priority (32) high and decides to transfer a datagram being encrypted as the addition quality (34), thereby making it possible to realize communication of high reliability as for the data including the authentication information.

Embodiment 5

It is possible to decide the connection qualities to be set more specifically, not only by detecting whether there exists the Authorization header field of the HTTP header or not, but also by examining the attribute value hence to recognize the adopted encryption method of the authentication information.

Hereinafter, the description will be made concretely.

When receiving the Authorization header field, the communication quality deciding unit 15 checks whether the authentication method within the Authorization header field is "Basic" or not. When the authentication method is "Basic", security is more fragile than the other authentication method. Therefore, the loss priority (32) is set high and a datagram is encrypted to be transferred, as the additional quality (34), thereby making it possible to realize communication of higher reliability as for a datagram including the authentication information "Basic" that is an authentication method of fragile security.

Embodiment 6

The attribute detecting unit 140 checks the presence of the Expires field newly, in addition to the HTTP header checked in the embodiment 1, 3, or 4, and when there exists the Expires field, the unit 140 supplies the same to the communication quality deciding unit 150 together with the attribute value thereof. Use of the Expires field can judge the valid date of a datagram.

The communication quality deciding unit 150 checks the Expires field, and when it has passed the present time, the cell loss priority is set as the minimum 0, or the datagram is abandoned immediately.

According to the above mentioned control, lower-valued data such that time elapsed longer after the data creation can be abandoned preferentially.

Embodiment 7

This embodiment will be described in the case of receiving a datagram such that the layer 3 is an IPv4, the layer 4 is a TCP, and the layer 5 is an SMTP.

The attribute detecting unit 140 recognizes that the layer 5 is an SMTP by the output of the layer identifying unit 130, checks the presence of the "From:" field of the SMTP mail header, and when there exists the "From:" field, the unit 140 supplies the same to the communication quality deciding unit 150 together with the attribute value thereof. Use of the "From:" field can judge E-mail address of a mail sending user.

In the QOS database 152, the values of the delay priority (31), the loss rate (32), the bandwidth (33), the connection priority (34), the additional quality (35), and the destination VPI (42), corresponding to the "From:" field, are established as for a user under contract.

The communication quality deciding unit 150 retrieves the QOS data table 150, checks the presence of the data corresponding to the user's E-mail address of the "From:" field; when there exists such data, the unit decides the established connection quality, and when there exists no such data, it decides the default connection quality.

Embodiment 8

This embodiment will be described in the case of receiving such a datagram that the layer 3 is an IPv4, the layer 4 is a TCP, and the layer 5 is an FTP.

FIG. 6 shows an example of getting a file by the ftp application.

In the example of FIG. 6, a user whose user name is user1 logs in the FTP server whose host name is ftpserver, so to get a file "test.dat". The head numeral and ":" are attached for convenience sake, to represent the number of lines.

The line starting from "- - - >" means that a client has transferred the FTP command to a server, and the line starting from three digits and one blank means that a client has received FTP reply from a server.

In the case of getting a file named "test.dat", when a user enters a command "get test.dat" (10th line), a client supplies a PORT command to a server at first (11th line), and upon receipt of the FTP reply of the PORT command success from the server (12th line), a PETR command is supplied to the server (13th line). In the FTP application, connection for control and connection for data are set individually. The PORT command is a command for transmitting the port number and the IP address at a client side in the TCP connection used for data transfer, and the PETR command is a command for a client requesting a server to transmit a file.

In the example of FIG. 6, the IP address at a client side is 140.252.13.34 and the port number is 1174(4×256+150). Upon receipt of the PETR command, a server establishes a connection with a client host port specified by the PORT command, and transfers a specified file by use of the connection after sending the FTP reply of the FTP reply code "150" to the client.

The attribute detecting unit 140 recognizes that the layer 5 is an FTP from the output of the layer identifying unit 130, judges whether a datagram is the FTP command or the FTP reply, and supplies the result to the communication quality deciding unit 150.

The communication quality deciding unit 150 judges whether it is a user registered in a bandwidth increasing service for FTP, from the source IP (42). When the user proved to be a registered user and the FTP command proved to be the PORT command, the unit 150 stores the IP address and the port number that are parameters of the PORT command. When receiving the PETR command next in the same connection, use of the stored IP address and port number and the destination IP address and port number in the current connection can previously distinguish a connection for use in file transfer from a server to a client.

According to the above, setting large a bandwidth (33) of a connection for use in file transfer from the server to a client can assign a large bandwidth only to the connection in the FTP file transfer efficiently.

At this time, the communication quality deciding unit 150 supplies the information for discriminating a connection for use in file transfer and the connection quality set for the connection for use in the file transfer, to the connection communication quality control unit 170.

The connection communication quality control unit 170 decides the communication qualities based on the input connection qualities, as for the connection for use in the file transfer.

Embodiment 9

Concerned with the embodiment 8, when detecting the FTP reply reporting that a connection for use in file transfer is established, from a datagram, and further detecting that the reply code within the FTP reply is "150" (14th line), data size indicated in the data next to the reply code is recognized, thereby making it possible to change the bandwidth set according to the file size.

Embodiment 10

The attribute detecting unit 140 checks the presence of Pragma field or Cache-Control field newly, in addition to the HTTP header checked in the embodiment 1, and when there exists the Pragma field or the Cache-Control field and its attribute value is "no-cache", the unit 140 supplies the same to the communication quality deciding unit 150.

The communication quality deciding unit 150 sets each path separately when the cache is usable and when the cache is unusable, as for access to the HTTP Server defined by the specified destination IP address (41-1).

When the destination IP address within the datagram is the destination IP address (41-1) having been registered, cache is judged to be usable or not depending on input of "no-cache" information and a patch to which the data is transferred.

Switching paths depending on use of a cache can disperse traffic flowing on a network and a connection with no use of a cache can be controlled so as to pass the data through a high-speed gate way.

Embodiment 11

When the receiving datagram is an HTTP request message, the attribute detecting unit 140 checks Request-URI in Request-line, If-Modified-Since field, and If-Unmodified-Since field, and when there exists some of them, the unit 140 supplies the result to the communication quality deciding unit 150 together with the attribute value thereof.

A user previously under contract with a service provided by this communication datagram transfer system should register URI likely to be checked frequently by If-Modified-Since field or If-Unmodified-Since field and its updating time in a controlled WWW server. A table of the registered URI and updating time thereof is controlled in the communication quality deciding unit 150.

When Request-URI is in coincidence with the registered URI and the attribute value of If-Modified-Since field or If-Unmodified-Since field is entered, the communication quality deciding unit 140 makes a comparison between the attribute value and final updating time obtained by referring to a table.

When the time obtained from If-Modified-Since field is long before the final updating time of the URI, or when the time obtained from If-Unmodified-Since field is long before the final updating time, the datagram (D) is transferred to the datagram destination path (R) supplied by the path deciding unit.

When the time obtained from If-Modified-Since field is long before the final updating time of the URI, the loss priority (32) of a datagram is set low, or after the datagram is abandoned, an HTTP response message such that Status Code is 304 (not modified) is created and transferred to the source IP address.

When the time obtained from If-Unmodified-Since field is short before the final updating time of the URI, the loss priority (32) of a datagram is set low, or after the datagram is abandoned, an HTTP response message such that Status Code is 402 (Precondition Failed) is created and transferred to the source IP address.

According to the above, it is possible to inhibit unnecessary traffic from entering into a server and a network.

Besides the method of previously registering URIs, when the received datagram (D) is an HTTP response message and there exists a Last-Modified header within the HTTP header of the datagram, a method of registering a set of URI (U) and final updating time obtained from the Last-Modified header may be considered. The URI is extracted from Request-URI, or from Request-URI and Host header within the HTTP request message from a user terminal to a WWW server. Match of an HTTP request message and an HTTP response message is recognized from the connection information (C) of a datagram (D) forming the HTTP request message or HTTP response message. (Match of a connection between a request message and a response message is referred to the embodiment 20.) A URI to be registered may be restricted to a server of a user under contract beforehand or a specified directory within a server, alternatively all URIs are to be registered.

Embodiment 12

When the receiving datagram is an HTTP request message, the attribute detecting unit 140 checks Request-URI of Request-line, in addition to the HTTP header checked in the embodiment 1 and supplies the read-out URI as the attribute value to the communication quality deciding unit 150.

The communication quality deciding unit 150 adds the item of URI to the extended QOS table.

The communication quality deciding unit 150, upon receipt of a URI from the attribute detecting unit 140, retrieves the extended QOS table, and when there exists the received URI within the table, the communication quality (Q) is decided by reference to the extended QOS table. Check of URI coincidence may be completely performed by the unit of file, or with a URI registered by the unit of Directory, coincidence may be judged by the registered URI string included in the URI input from the attribute detecting unit 140.

It is possible to provide a registered user with high speed and various communication services, by deciding communication quality depending on a URI.

A URI extracted from the HTTP header in the attribute detecting unit 140 may be, in addition to Request-URI within Request-line, either a referred URI of the HTTP data extracted by Referer, a URI including the HTTP data extracted by Location, a destination URI of a datagram extracted by Forwarded, a base URI of a datagram extracted by Content-Base, or a URI having the HTTP data extracted by Content-Location, or it may be all.

Embodiment 13

When the receiving datagram is an HTTP request message, the attribute detecting unit 140 checks Method and supplies the result to the communication quality deciding unit 150.

Communication resources for a connection from this communication datagram transfer system toward the direction of a source IP address are previously assigned, in the communication quality deciding unit 150, thereby making it possible to transfer a datagram to a user side according to the connection quality already established when actually receiving the HTTP response message from the Server side.

When the Method is Get or POST as the connection quality (S) to be set, the bandwidth (33) is set large. When the Method is GET or POST, it is considered that the information amount is greater than when the Method is HEAD; therefore, bandwidth can be assigned effectively.

Embodiment 14

The attribute detecting unit 140 checks the presence of MIME-Version newly, in addition to other than the HTTP header checked in the embodiment 1, and when there is, the unit 140 supplies the same to the communication quality deciding unit 150 together with the attribute value thereof. The communication quality deciding unit 150 adds the item of MINE-Version to the basic QOS table, in addition to the Content-type (21), and decides the connection quality by a set of MINE-Version and Content-type.

Embodiment 15

When the received datagram is an HTTP request message, the attribute detecting unit 140 checks the presence of Accept, Accept-Charset, Accept-Encoding, and Accept-Language, and when there are, the unit 140 supplies the result to the communication quality deciding unit 150 together with the attribute value thereof.

Figures 10, 12:
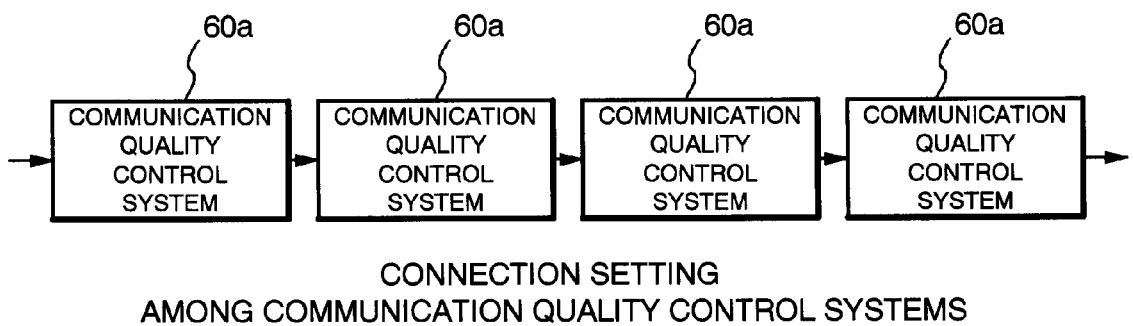
FIG. 10 is a view for use in describing an example of a server information control table.
FIG. 12 is a block diagram for use in describing an example of setting a connection among the communication quality control systems.

The communication quality deciding unit 150 stores the information of the IP address (41) of a Web server, media attribute (51) corresponding to the Web Server, character set (52), encoding method (53), and language (54), as for a WWW server managed by a user under contract beforehand, into the server information control table (500). An Example of the server information control table (500) is shown in FIG. 10.

When receiving one or some of Accept, Accept-Charset, Accept-Encoding, and Accept-Language from the attribute detecting unit 140, the communication quality deciding unit 150 checks whether the destination IP address (41) of a datagram to be transferred exists in the Server information control table (500). When there exists the destination IP address (41), the following processing will be performed.

(1) It is checked whether the attribute value of Accept is in coincidence with the attribute value registered in the media attribute (51). When the destination IP address (41) is IP address 3, it is matched with "text/html" and "text/plain" as the media attribute of a text. When the attribute value of Accept is the media attribute of a text other than "text/plain" and "text/html", it is judged that the media attribute (51) has no agreement.

When the destination IP address (41) is IP address 3, the media attribute of the other image or sound is not defined particularly. When the destination IP address (41) is IP address 1 and IP address 2, the media attribute (51) of the server information control table (500) is "-". In this case, the media attribute (51) corresponding to the Web Server is not registered and a comparison with the attribute of Accept is not made.

(2) It is checked whether the media attribute value of Accept-Charset is in coincidence with the character set (52). When the destination IP address (41) is IP address 1, it is matched with only "ISO-8859-1" as the character set (52). When the attribute value of Accept-Charset is any other than "ISO-8859-1", it is judged that the character set (52) has no agreement.

(3) It is checked whether the attribute value of Accept-Encoding is in coincidence with the encoding method (53). When the destination IP address (41) is IP address 1 or IP address 2, it is matched with "gzip" and "compress" as the encoding method (53). When the attribute of Accept-Encoding is any other than "gzip" and "compress", it is judged that the encoding method (53) has no agreement.

When the destination IP address (41) is IP address 3, the encoding method (53) is "×". In this case, the Web server is not matched with any encoding method. It is judged that the encoding method (53) has no agreement whatever attribute of Accept-Encoding may be.

(4) It is checked whether the attribute value of Accept-Language is in coincidence with the language (54). When the language (54) is IP address 1, it is matched with "en" and "jp" as the language (54). When the attribute value of Accept-Language is any other than "en" and "jp", it is judged that the language (54) has no agreement.

When the communication quality deciding unit 150 judges that there is no agreement in one or some of the media attribute (51), the character set (52), the encoding method (53), and the language (54), in the above processing, the corresponding datagram is abandoned and such an HTTP response message that Status Code is 406 (Not Acceptable) is created and transferred to the source IP address.

Although the embodiment 15 is a control for abandoning a message having no agreement, with the media attribute (51), the character set (52), the encoding method (53), and the language (54), manageable by the WWW server side, registered previously, a method of registering the media attribute (51), the character set (52), the encoding method (53), and the language (54) manageable by the client side may be considered.

In this case, when the HTTP response message has no registration of the attribute values detected from the media attribute (51) within Content-Type, the encoding method (53) within Content-Encoding, and the language (54) within Content-Language, a datagram belonging to the connection is abandoned, or the loss rate is set low, thereby making it possible to inhibit unnecessary traffic from entering into a network.

Embodiment 16

When the received datagram is an HTTP response message, the attribute detecting unit 140 checks Status Code and supplies the result to the communication quality deciding unit 150 together with the attribute value thereof.

The communication quality deciding unit 150, upon receipt of the Status Code, sets the bandwidth (33) large only when the attribute value thereof is 200 (OK).

Since a lot of datagrams are supposed to be transferred in a connection defined by the datagram, only when the Status Code is 200 (OK), bandwidth can be assigned efficiently.

Embodiment 17

When the received datagram is an HTTP response message, the attribute detecting unit 140 checks whether the HTTP header includes a WWW-Authenticate header and supplies the result to the communication quality deciding unit 150.

When a datagram including the WWW-Authenticate header is transferred, there is a possibility of the same datagram including a datagram having the authentication information, or a datagram received from the WWW server after authentication.

The communication quality deciding unit 150, upon receipt of the information that the received datagram (D-17) includes the WWW-Authenticate header, sets the loss priority (32) high for a fixed period of time, as for an HTML connection between a user terminal and a WWW server, according to the destination IP address (41) and the source IP address (42) included in the datagram (D-17), and decides the connection quality (S) so to transfer the datagram being encrypted as the additional quality (34), thereby making it possible to realize communication of high reliability as for a datagram between a user terminal and a WWW server.

Embodiment 18

When the received datagram is an HTTP response message, the attribute detecting unit 140 checks whether a Proxy-Authenticate header is included in the HTTP header and supplies the result to the communication quality deciding unit 150.

When a datagram including the Proxy-Authenticate header is transferred, there is a possibility of the datagram including a datagram having authentication information or a datagram received from the Proxy server after authentication.

The communication quality deciding unit 150, upon receipt of the information such that the received datagram (D-18) includes the Proxy-Authenticate header, sets the loss priority (32) high for a fixed period of time, as for an HTML connection between a user terminal and a proxy server, according to the destination IP address (41) and the source IP address (42) included in the datagram (D-18), and decides the connection quality (S) so to transfer the datagram being encrypted as the additional quality (34), thereby making it possible to realize communication of high reliability as for a datagram between a user terminal and a proxy server.

Embodiment 20

The structure of the embodiment 20 of the present invention will be described in detail with reference to the drawings.

Figure 11:
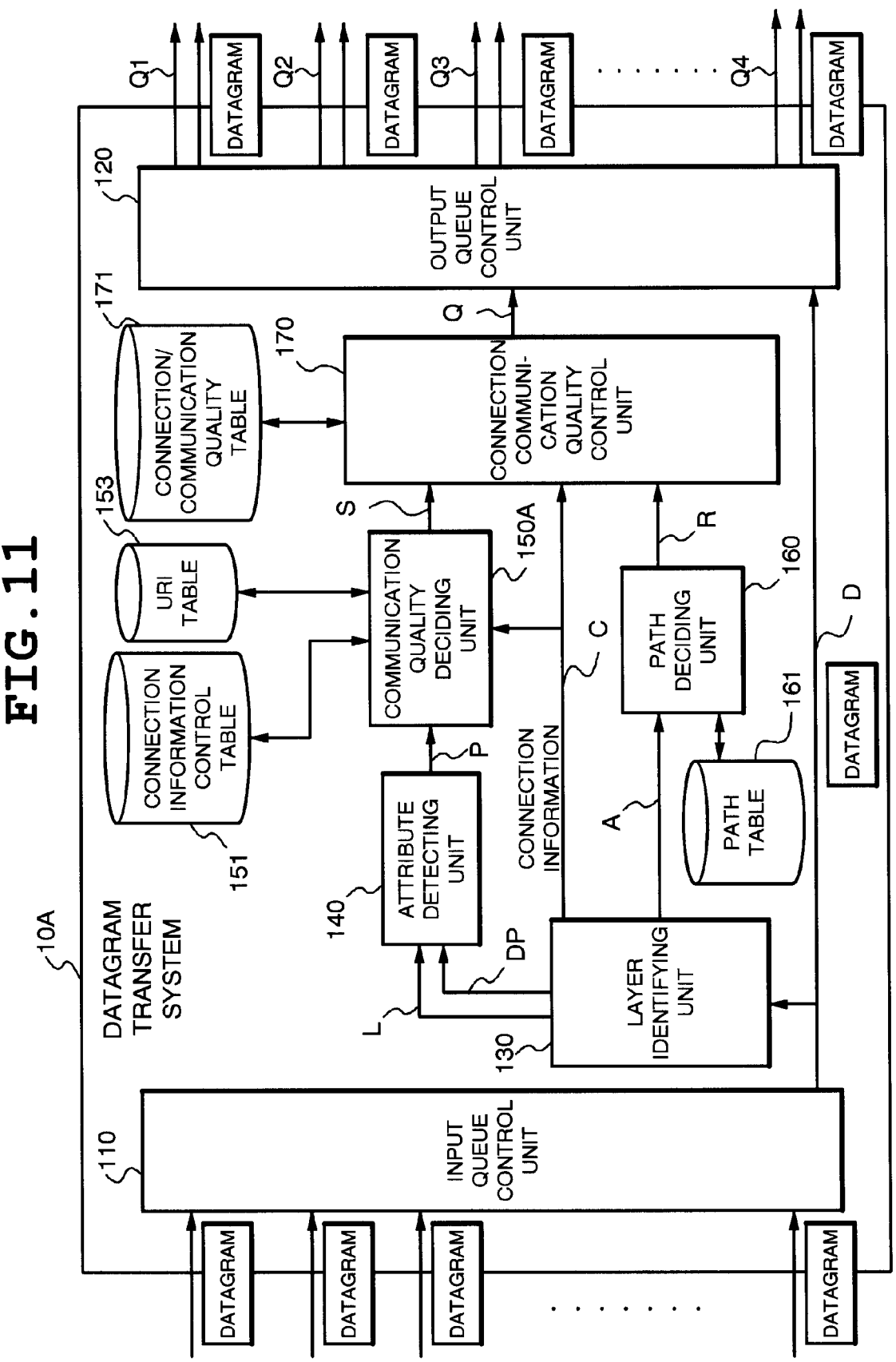
FIG. 11 is a block diagram for use in describing another constitution example of a communication datagram transfer system.

FIG. 11 is a block diagram showing the structural example of a communication datagram transfer system 10A according to the embodiment 20 of the present invention.

When the received datagram (D) is an HTTP request message, the attribute detecting unit 140 extracts an absolute-URI (70) toward a WWW server to be accessed, according to a request URI within the HTTP header or the request URI and the Host header field, and supplies the same to the communication quality deciding unit 150A.

The communication quality deciding unit 150A stores a set of connection information (C) entered from the connection identifying unit 130 and the URI (70) entered from the attribute detecting unit 140 into the connection information control table 151.

When the received datagram is an HTTP response message, the attribute detecting unit 140 checks the presence of Allow field, Accept-Range field, Content-Base field, and Content-Location field within the HTTP header and when there is, it supplies the result to the communication quality deciding unit 150A together with the attribute value thereof.

The communication deciding unit 150A, upon receipt of one or both of Allow field and Accept-Range field within the HTTP header, checks whether Content-Base field is entered or not, and when the Content-Base field is entered, it stores a set of the absolute-URI that is the attribute value within the Content-Base field, allow method (80) within the Allow field, and an allow range (81) within the Accept-Range field, into the URI table 153.

When the Content-Base field is not entered, it checks whether the Content-Location field is entered nor not, and when the Content-Location field is entered, it stores a set of the absolute-URI that is the attribute value within the Content-Location field, the allow method (80) within the Allow field, and the allow range (81) within the Accept-Range field, into the URI table 153.

When the Content-Location field is not entered, it reads out a URI (70) corresponding to the connection information (C) from the connection information control table 151 and stores a set of the URI (70), the allow method (80) within the Allow field, and the allow range (81) within the Accept-Range filed, into the URI table 153.

When the received datagram is an HTTP request message, the attribute detecting unit 140 extracts method (71) within the HTTP header and supplies the same to the communication quality deciding unit 150A.

When the received datagram is an HTTP request message, the attribute detecting unit 140 checks the presence of If-Range header or Range header within the HTTP header, and when there is, it extracts the Range header or range (72) that is the attribute value of the If-Range header and supplies the same to the communication quality deciding unit 150A.

Upon receipt of the URI (70) from the attribute detecting unit 140, the communication quality deciding unit 150A retrieves the URI table 153 to check whether the allow range (81) or allow method (80) corresponding to the URI is registered therein.

When the allow method (80) is registered therein, it is compared with the method (71) entered from the attribute detecting unit 140. As a result of the comparison, when the method (71) is not registered therein, the datagram (D) is abandoned, or after its abandonment, an HTTP response message such that Status Code is 405 (Method Not Allowed) is created and transferred to the source IP address.

When the allow range (81) is registered and the range (72) is entered from the attribute detecting unit 140, the allow range (81) is compared with the range (72). As a result of the comparison, when the requesting method by the range (72) is not that one registered in the allow range (81), headers relative to the Range header included in the datagram (D) are arranged to be removed, as the additional quality (53).

The headers relative to the Range header are removed in the output queue control unit 120.

When the datagram (D) includes the Range header, the removed headers are the Range header, IF-Unmodified-Since header, and If-Match header, while when the datagram (D) includes the If-Range header, the removed header is only the If-Range header.

Embodiment 21

Basic structure of the embodiment 21 is the same as that of the embodiment 20. However, the WWW server table 154 is used instead of the URI table 153.

When the received datagram is an HTTP response message, the attribute detecting unit 140 checks the presence of Public field within the HTTP header, and when there exists, the unit 140 supplies the same to the communication quality deciding unit 150A together with the attribute value thereof.

The communication quality deciding unit 150A, upon receipt of the Public field within the HTTP header, extracts host name (700) of a WWW server from one of the URI that is the attribute value of the Content-Base field, the URI that is the attribute value of the Content-Location field, or the URI (70) read from the connection information control table 151, and registers a set of the host name (700) and the allow method (800) within the Public field into the WWW server table 154.

Upon receipt of the URI (70) from the attribute detecting unit 140, the communication quality deciding unit 150A retrieves the WWW server table 154 so to check whether the allow method (800) corresponding to the WWW server host name (700) extracted from the URI (70) is registered.

When the allow method (800) is registered therein, it is compared with the method (71) entered from the attribute detecting unit 140. As a result of the comparison, when the method (71) is not registered, the datagram (D) is abandoned, or after its abandonment, an HTTP response message such that Status Code is 405 (Method Not Allowed) is created and transferred to the source IP address.

Embodiment 22

It is possible to add the following control to the above-mentioned respective embodiments such that the layer 5 is an HTTP.

When detecting a Content-Length in an HTTP response message, the bandwidth (33) is assigned according to the length of the Content-Length.

Embodiment 23

It is possible to add the following control to the above-mentioned respective embodiments such that the layer 5 is an HTTP.

When detecting a Connection in an HTTP response message and the attribute value of the Connection is "persistent", the bandwidth (33) is set large.

When the attribute value of the Connection is "persistent", much more datagrams are supposed to be transferred than in the case of the other attribute; therefore, efficient datagram transfer is possible.

Embodiment 24

It is possible to add the following control to the above-mentioned respective embodiments such that the layer 5 is an HTTP.

When detecting a Warning header in an HTTP response message and the Warn-code of the Warning header is 10 (Response is stale), the loss priority is set lower, thereby making it possible to abandon the old datagram preferentially.

Embodiment 25

It is possible to add the following control to the above-mentioned respective embodiments such that the layer 5 is an HTTP.

When detecting a Retry-After header in an HTTP response message, accessible time to the URI required next is extracted from the Retry-After and a set of the URI (70) and the accessible time is stored in the URI table.

When access is requested to the same URI (70), the accessible time is read out from the URI table and when it is before the receiving time of the datagram, the datagram is abandoned.

When it is possible to calculate the time from receiving a datagram to actually transferring the datagram to the WWW server, the accessible time may be compared with the time of transferring a datagram to the WWW server.

Embodiment 26

It is possible to add the following control to the above-mentioned respective embodiments such that the layer 5 is an HTTP.

When a Via header is detected within the HTTP header and the Via header includes host name and program name registered beforehand, the communication quality (S) registered in the table is set and a datagram is transferred.

The host name and the program name in the proxy passing through the above control can provide communication quality depending on a contract.

Embodiment 27

When the received datagram (D) is an HTTP response message and it is of the IP address destined for a user previously registered, the attribute detecting unit 140 checks the presence of a Transfer-Encoding header within the HTTP header. When there is no Transfer-Encoding header, a datagram is arranged to be encrypted and transferred as the additional quality (35), with respect to a connection to which the received datagram (D) belongs.

According to the above control, it is possible to transfer a datagram having fragile security and having no Transfer-Encoding header safely.

Embodiment 28

When the layer 4 of the received datagram is a TCP, the attribute detecting unit 140 checks URG (URGent) that is Code bit of the TCP header, and supplies the result to the communication quality deciding unit 150.

When 1 is set in the URG field, the communication quality deciding unit 150 judges that it is an urgent segment and sets the delay priority and the loss priority high, thereby providing high-speed and reliable communication quality.

Embodiment 29

When the layer 4 of the received datagram is a UDP, the attribute detecting unit 140 checks whether the checksum field of the UDP header is 0, and supplies the result to the communication quality deciding unit 150.

Upon receipt of the information that the checksum field is 0, the communication quality deciding unit 150 recognizes that the datagram uses no checksum. When the destination IP address of the datagram or the source IP address is in coincidence with the IP address of a user previously registered, it sets the loss priority high, and if possible, it sets a physical line for the exclusive use which is suppressible of data error, for use, as the additional quality.

According to the above control, even in the UDP communication using no checksum, a user under contract can be provided with reliable communication.

Embodiment 30

When the layer 5 of the received datagram is a DNS, the attribute detecting unit 140 checks the presence of "query type", and when there exists the "query type", it supplies the same to the communication quality deciding unit 150.

Upon receipt of the "query type", the communication quality deciding unit 150 checks whether its value is 252.

When the value is 252, it is a "zone transfer" request, and much more datagrams are supposed to be transferred than in the case of the other DNS message; therefore, the bandwidth (33) is set larger.

Embodiment 31

When the layer 5 of the received datagram is a TFTP, the attribute detecting unit 140 checks "opcode" included in the TFTP message and supplies the result to the communication quality deciding unit 150.

The attribute detecting unit 140 detects the UDP length included in the UDP header and supplies the same to the communication quality deciding unit 150.

Upon receipt of "opcode", the communication quality deciding unit 150 checks whether its value is 3.

When "opcode" is 3 and the length of the TFTP message calculated by the UDP length is 512, it proves that the TFTP transfers the data; therefore, the bandwidth (33) is set large.

When "opcode" is 3 and the length of the TFTP message calculated by the UDP length is 512 or less, it proves that the data transfer is completed by the TFTP; therefore, the bandwidth (33) is set small.

According to the above control, the bandwidth can be assigned large only at a time of data transfer.

Embodiment 32

When the layer 5 of the received datagram is an SNMP, the attribute detecting unit 140 checks PDU type included in the SNMP message and supplies the result to the communication quality deciding unit 150.

When the PDU type is 4 as a result of the PDU type check, the communication quality deciding unit 150 recognizes that the SNMP message is a trap message and set the delay priority (31) of the datagram high, thereby making it possible to transfer the trap message at a high speed.

Embodiment 33

In addition to the embodiment 1, this embodiment newly adds connection-setting robustness (strength) (37) to the connection communication quality (S) decided in the communication quality deciding unit 150. A user previously contracted user can set one of the three stages of connection-setting robustness (37) selectively.

The connection communication quality control unit 170 sets a connection (FIG. 12) among the communication quality control systems 60*a*, 60*b*, 60*c*, and 60*d*, based on the input connection-setting robustness (37), as follows.

Figure 13:
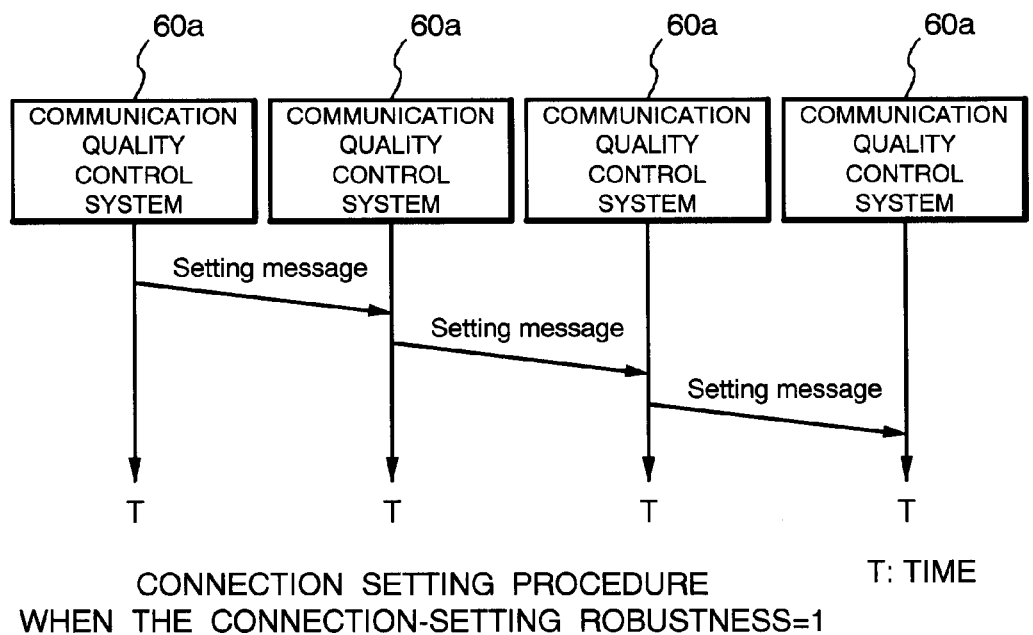
FIG. 13 is a block diagram for use in describing an example of setting a connection among the communication quality control systems.

(1) When the connection-setting robustness=1 (FIG. 13), the communication quality control system 60*a* sends a connection-setting message having necessary information for setting a connection and at the same time, starts the datagram transfer. Upon receipt of the connection-setting message, the communication quality control systems 60*b* and 60*c* sends the connection-setting message to the communication quality control systems 60*c* and 60*d* and simultaneously transfers the received datagram.

Figure 14:
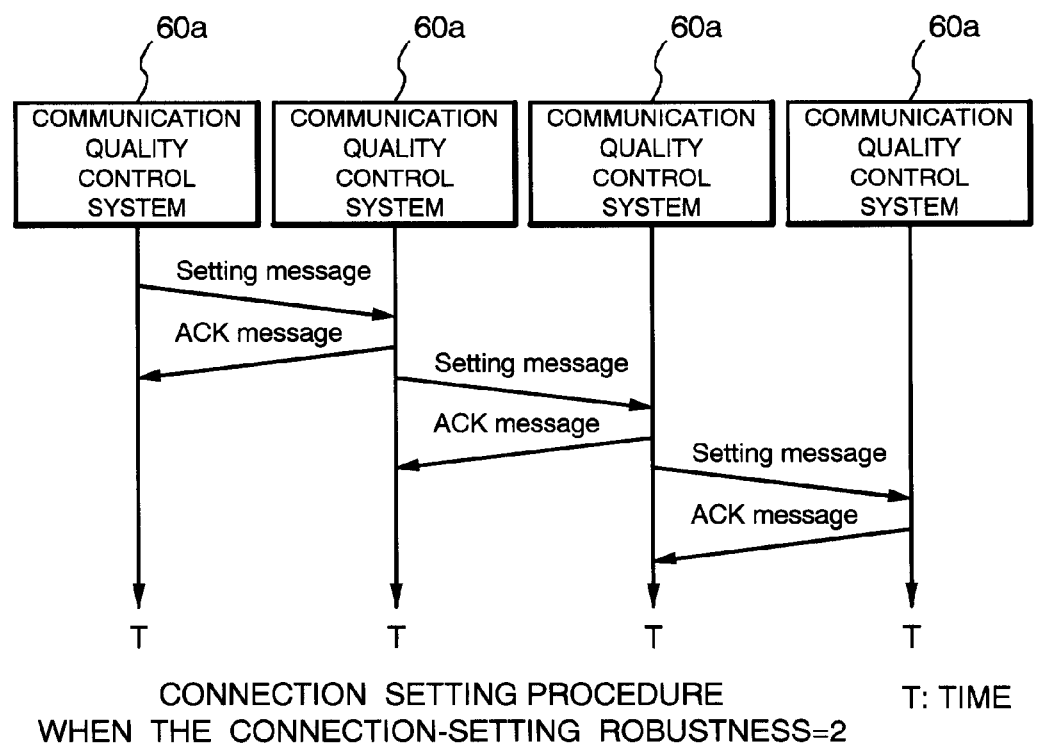
FIG. 14 is a block diagram for use in describing an example of setting a connection among the communication quality control systems.

(2) When the connection-setting robustness=2 (FIG. 14), the communication quality control system 60*a* sends a connection-setting message having necessary information for setting a connection. Upon receipt of the connection-setting message, the communication quality control systems 60*b*, 60*c*, and 60*d* send the ACK message to the communication quality control systems 60*a*, 60*b*, and 60*c* of a sending party if the connection setting is possible under a predetermined condition. After sending the ACK message, the communication quality control systems 60*b* and 60*c* send the connection-setting message to the communication quality control systems 60*c* and 60*d*. Upon receipt of the ACK message, the communication quality control systems 60*a*, 60*b*, and 60*c* start the datagram transfer. Thus, a datagram is to be transferred after each connection is established between each adjacent communication quality control system.

Figure 15:
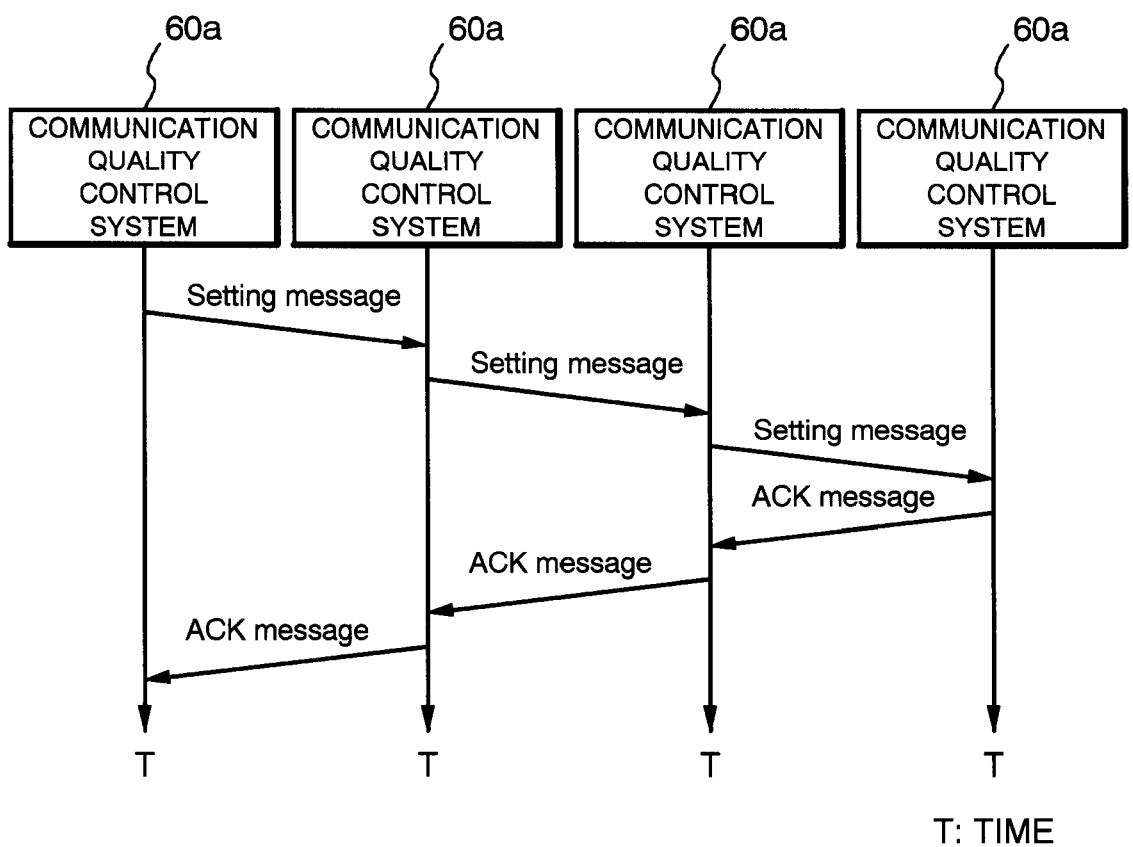
FIG. 15 is a block diagram for use in describing an example of setting a connection among the communication quality control systems.

(3) When the connection-setting robustness=3 (FIG. 15), the communication quality control system 60*a* sends a connection-setting message having necessary information for setting a connection. When receiving the connection-setting message, the communication quality control systems 60*b* and 60*c* create a connection-setting message and send the same to the communication quality control systems 60*c* and 60*d* of a receiving party if the connection-setting is possible under a predetermined condition. Upon receipt of the connection-setting message, the communication quality control system 60*d* sends the ACK message to the communication quality control system 60*c* of a sending party if the connection-setting is possible under a predetermined condition. Upon receipt of the ACK message, the communication quality control systems 60c and 60b send the ACK message to the communication quality control systems 60b and 60a. Upon receipt of the ACK message, the communication quality control system 60a starts the datagram transfer. Thus, a datagram is to be transferred after the connection among the communication quality control systems 60a, 60b, 60c, and 60d is completely established, thereby enabling reliable datagram transfer.

As mentioned above, according as the connection-setting robustness is greater, more assuredly a datagram is guaranteed to be transferred. A user may select a connection-setting robustness in accordance with the required quality of a datagram to be transferred.

The present invention is not restricted to the above-mentioned embodiments, but various modification may be made within the spirit of the invention.

As set forth hereinabove, the communication quality control system of the present invention has the following effects.

First, it can decide communication quality depending on media attribute of communication. This is why attributes of a connection such as an image, a voice, a moving image, and an application can be recognized by extracting the attributes of the portion of the layer 5 in a datagram such as Content-type of the HTTP header, by way of example, thereby enabling communication depending on respective suitable connection qualities.

Secondly, it can realize various advanced communication services for a user previously registered. This is why a user name, a using client soft name, a server name and the like at a datagram sending party or at a datagram receiving party can be specified, for example, from Server, User-Agent, and From in the HTTP header and From line of the mail header in the SMTP, thereby making it possible to transfer a datagram by use of the connection quality in accordance with the contract, with respect to a user or a software manufacturing company previously having been registered.

Thirdly, it can demand an account depending on communication quality. This is why the rate or the basic charge in asking an account is decided depending on connection quality corresponding to the communication attributes obtained from the layer 4 and upper.

Fourthly, judging whether a datagram includes very important data on security, it can realize data transfer depending on the security quality corresponding to the datagram. This is why, by judging the presence of, for example, Authorization header field in the HTTP header, it can detect whether the datagram includes authentication information.

Fifthly, it can judge the novelty of a datagram and decide quality of a connection. This is why importance of a datagram can be judged from the viewpoint of time, according to the information such as created date and valid date of a datagram like Date and Expires in the HTTP header, for example, thereby realizing a control of abandoning old data preferentially.

Sixthly, it can transfer a datagram in the optimum communication quality by deciding connection quality based on not only the information recognized in the same connection but also the information recognized in the other connection. This is why, by recognizing the content of FTP command or FTP reply, for example, in transferring a datagram of the FTP application, new establishment of another connection for file transfer can be recognized, thereby enabling assignment of a large bandwidth only in the file transfer.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A communication quality control system for realizing an optimum datagram transfer function for connection quality corresponding to attributes of communication, comprising:

network end systems for respectively terminating a protocol layer of an existent data network;

protocol end systems for respectively terminating the protocol layer 3 and beneath based on quality of communication of a received datagram; and a communication datagram transfer system for transferring the datagram to a specified end system according to quality information of a connection corresponding to communication attributes of the protocol layer 3 and beneath and communication attributes derived from the information on the respective protocol layers 4, 5, 6, and 7 or one of them included in a datagram received by an arbitrary end system, said communication datagram transfer system including
attribute detecting means of checking identifying information included in the information of the protocol layer 3 and beneath of a datagram received by some end system and simultaneously checking identifying information included in the information of the respective protocol layers 4, 5, 6, and 7 or one of them, hence to take out the communication attribute information of the respective protocol layers, and communication quality deciding means for, when a datagram is received by a protocol end system, deciding communication quality for sending the datagram according to a set of the communication attribute information of the respective protocol layers derived from the datagram and the quality information of a connection, and notifying the communication quality to said protocol end system.

2. A communication quality control system as claimed in claim 1, in which said attribute detecting means
identifies the layer information, from the received datagram, as well as the state of a connection from the connection identifying information of a datagram, so to supply the result to said communication quality deciding means as connection information, and decides a transfer path of the datagram, so to supply the transfer path to said communication quality deciding means as destination path information, and said communication quality deciding means decides quality information of a connection corresponding to the attribute information and decides communication quality for sending a datagram according to the connection information, the quality information of the connection, and the destination path information.

3. A communication quality control system as claimed in claim 1, in which said attribute detecting means
identifies the layer information, from the received datagram, as well as the state of a connection from the connection identifying information of a datagram, so to supply the result to said communication quality deciding means as connection information, and decides a transfer path of the datagram, so to supply the transfer path to said communication quality deciding means as destination path information: and
said communication quality deciding means decides quality information of a connection corresponding to the attribute information and decides communication quality for sending a datagram according to the connection information, the quality information of the connection, and the destination path information, and
takes out attribute information of communication according to the layer information and one or all of the datagram when it is judged that attributes of the layer 4 and upper need to be detected from the identified state of a connection.

4. A communication quality control system as claimed in claim 1, in which
said attribute detecting means
identifies the layer information, from the received datagram, as well as the state of a connection from the connection identifying information of a datagram, so to supply the result to said communication quality deciding means as connection information, and decides a transfer path of the datagram, so to supply the transfer path to said communication quality deciding means as destination path information:
said communication quality deciding means decides quality information of a connection corresponding to the attribute information and decides communication quality for sending a datagram according to the connection information, the quality information of the connection, and the destination path information:
said communication datagram transfer system includes a connection/communication quality table in which a set of connection information and communication quality is registered: and
said communication quality deciding means
judges whether the datagram needs to be controlled by said connection-communication quality table when receiving the connection information and the destination path information, or the connection quality information,
checks the presence of the same connection in said connection/communication quality table when the datagram needs to be controlled, and when there is the same connection, said means decides communication quality referring to said connection/communication quality table, while when there is not, said means decides communication quality, according to the connection information, the quality information of a connection, and the destination path information, and stores a set of the connection information and the communication quality into said connection/communication quality table, and
decides communication quality according to the connection information and the destination path information when the datagram doesn't need to be controlled.

5. A communication quality control system as claimed in claim 1, in which
a database for storing the connection quality information corresponding to the attribute information is provided,
said communication quality deciding means decides the connection quality information, according to the attribute information, referring to said database.

6. A communication quality control system as claimed in claim 1, in which
assuming that the layer 3 is an IP, the layer 4 is a TCP, and the layer 5 is an HTTP,
said attribute detecting means
checks protocol number of the IP header of the datagram, or the same protocol number and port address within the TCP protocol header of the datagram, or header value next to the IP header of the datagram, or the next header value and port address of the TCP protocol header of the datagram, and knowing that the layer 5 is the HTTP, checks one or some identifying information included in the TCP header, or the TCP header and an HTTP message of the received datagram, and
when the datagram is transferred to a protocol end system, said communication quality deciding means decides quality of a connection of the layer 3 and beneath suitable for a connection derived from the datagram and performs datagram transfer processing based on the quality of the connection, hence to change the connection quality of a datagram to be transferred, so to do a transfer control.

7. A communication quality control system as claimed in claim 1, in which
assuming that the layer 3 is an IP, the layer 4 is a TCP, and the layer 5 is an HTTP,
said attribute detecting means
checks protocol number of the IP header of the datagram, or the same protocol number and port address within the TCP protocol header of the datagram, or header value next to the IP header of the datagram, or the next header value and port address of the TCP protocol header of the datagram, and knowing that the layer 5 is the HTTP, checks one or some identifying information included in the TCP header, or the TCP header and an HTTP message of the received datagram:
when the datagram is transferred to a protocol end system, said communication quality deciding means decides quality of a connection of the layer 3 and beneath suitable for a connection derived from the datagram and performs datagram transfer processing based on the quality of the connection, hence to change the connection quality of a datagram to be transferred, so to do a transfer control: and
said attribute detecting means
checks at least one of the following items: the media attribute of the datagram, from the Content type included in the HTTP header of a received datagram; E-mail address of a user who sent a datagram, from the From field included in the HTTP header; a user program name and the Version in which the datagram was created, from the User-Agent included in the HTTP header; and a server software name and the Version in which the datagram was created, from the Server included in the HTTP header, as the identifying information.

8. A communication quality control system as claimed in claim 1, in which
assuming that the layer 3 is an IP, the layer 4 is a TCP, and the layer 5 is an HTTP,
said attribute detecting means
checks protocol number of the IP header of the datagram, or the same protocol number and port address within the TCP protocol header of the datagram, or header value next to the IP header of the datagram, or the next header value and port address of the TCP protocol header of the datagram, and knowing that the layer 5 is the HTTP, checks one or some identifying information included in the TCP header, or the TCP header and an HTTP message of the received datagram:
when the datagram is transferred to a protocol end system, said communication quality deciding means decides quality of a connection of the layer 3 and beneath suitable for a connection derived from the datagram and performs datagram transfer processing based on the quality of the connection, hence to change the connection quality of a datagram to be transferred, so to do a transfer control: and
said attribute detecting means
checks at least one of the following items: the created date of the datagram, from the Date included in the HTTP header of a received datagram; authentication information of the datagram and the encrypting method of the authentication information, from the Authorization included in the HTTP header; the valid date of the datagram, from the Expires included in the HTTP header, as the identifying information.

9. A communication quality control system as claimed in claim 1, in which
assuming that the layer 3 is an IP, the layer 4 is a TCP, and the layer 5 is an HTTP,
said attribute detecting means
checks protocol number of the IP header of the datagram, or the same protocol number and port address within the TCP protocol header of the datagram, or header value next to the IP header of the datagram, or the next header value and port address of the TCP protocol header of the datagram, and knowing that the layer 5 is the HTTP, checks one or some identifying information included in the TCP header, or the TCP header and an HTTP message of the received datagram:
when the datagram is transferred to a protocol end system, said communication quality deciding means decides quality of a connection of the layer 3 and beneath suitable for a connection derived from the datagram and performs datagram transfer processing based on the quality of the connection, hence to change the connection quality of a datagram to be transferred, so to do a transfer control: and
said attribute detecting means
checks at least one of the following items: the required items of the datagram, from the Pragma included in the HTTP header of a received datagram; cache control information of the datagram, from the Cache-Control included in the HTTP header; execution requirements of the Method, from the If-Modified-Since included in the HTTP header; execution requirements of the Method, from the If-Unmodified-Since included in the HTTP header; a URI required by a client, from the request URI within a request line (Request-Line) included in the HTTP header; and the final updating time of the HTTP data, from the Last-Modified included in the HTTP header, as the identifying information.

10. A communication quality control system as claimed in claim 1, in which
assuming that the layer 3 is an IP, the layer 4 is a TCP, and the layer 5 is an HTTP,
said attribute detecting means
checks protocol number of the IP header of the datagram, or the same protocol number and port address within the TCP protocol header of the datagram, or header value next to the IP header of the datagram, or the next header value and port address of the TCP protocol header of the datagram, and knowing that the layer 5 is the HTTP, checks one or some identifying information included in the TCP header, or the TCP header and an HTTP message of the received datagram:
when the datagram is transferred to a protocol end system, said communication quality deciding means decides quality of a connection of the layer 3 and beneath suitable for a connection derived from the datagram and performs datagram transfer processing based on the quality of the connection, hence to change the connection quality of a datagram to be transferred, so to do a transfer control: and
said attribute detecting means
checks at least one of the following items: a referred URI (Uniform Resource Identifiers) of the HTTP data, from the Referer included in the HTTP header of a received datagram; a URI in which the HTTP data is located, from the Location included in the HTTP header; a destination URI and source domain name of the datagram, from the Forwarded included in the HTTP header; the base URI of the datagram, from the Content-Base included in the HTTP header; a URI in which the HTTP data is located, from the Content-Location included in the HTTP header; a method of requiring HTTP data from a user program, from the Method included in the HTTP header, as the identifying information.

11. A communication quality control system as claimed in claim 1, in which
assuming that the layer 3 is an IP, the layer 4 is a TCP, and the layer 5 is an HTTP,
said attribute detecting means
checks protocol number of the IP header of the datagram, or the same protocol number and port address within the TCP protocol header of the datagram, or header value next to the IP header of the datagram, or the next header value and port address of the TCP protocol header of the datagram, and knowing that the layer 5 is the HTTP, checks one or some identifying information included in the TCP header, or the TCP header and an HTTP message of the received datagram:
when the datagram is transferred to a protocol end system, said communication quality deciding means decides quality of a connection of the layer 3 and beneath suitable for a connection derived from the datagram and performs datagram transfer processing based on the quality of the connection, hence to change the connection quality of a datagram to be transferred, so to do a transfer control: and said attribute detecting means
  checks at least one of the following items: the Version in which the datagram is MIME (Multipurpose Internet Mail Extensions), from the MIME-Version included in the HTTP header of a received datagram; the media attribute a user program permits, from the Accept included in the HTTP header; a character set a user program permits, from the Accept-Charset included in the HTTP header; a coding method of datagrams a user program permits, from the Accept-Encoding included in the HTTP header; a datagram language a user program permits, from the Accept-Language included in the HTTP header; an encoding method of datagrams, from the Content-Encoding included in the HTTP header; and a datagram language, from the Content-Language included in the HTTP, as the identifying information.

12. A communication quality control system as claimed in claim 1, in which
  assuming that the layer 3 is an IP, the layer 4 is a TCP, and the layer 5 is an HTTP,
  said attribute detecting means
    checks protocol number of the IP header of the datagram, or the same protocol number and port address within the TCP protocol header of the datagram, or header value next to the IP header of the datagram, or the next header value and port address of the TCP protocol header of the datagram, and knowing that the layer 5 is the HTTP, checks one or some identifying information included in the TCP header, or the TCP header and an HTTP message of the received datagram:
    when the datagram is transferred to a protocol end system, said communication quality deciding means decides quality of a connection of the layer 3 and beneath suitable for a connection derived from the datagram and performs datagram transfer processing based on the quality of the connection, hence to change the connection quality of a datagram to be transferred, so to do a transfer control: and
  said attribute detecting means
    checks at least one of the following items: response content of a server replying to a request from a user program, from the Status Code included in the HTTP header of a received datagram; authentication information required by a server, from the WWW-Authenticate included in the HTTP header; authentication information required by a proxy server, from the Proxy-Authenticate included in the HTTP header; authentication information of the datagram, from the Proxy-Authorization included in the HTTP header, as the identifying information.

13. A communication quality control system as claimed in claim 1, in which
  assuming that the layer 3 is an IP, the layer 4 is a TCP, and the layer 5 is an HTTP,
  said attribute detecting means
    checks protocol number of the IP header of the datagram, or the same protocol number and port address within the TCP protocol header of the datagram, or header value next to the IP header of the datagram, or the next header value and port address of the TCP protocol header of the datagram, and knowing that the layer 5 is the HTTP, checks one or some identifying information included in the TCP header, or the TCP header and an HTTP message of the received datagram:
    when the datagram is transferred to a protocol end system, said communication quality deciding means decides quality of a connection of the layer 3 and beneath suitable for a connection derived from the datagram and performs datagram transfer processing based on the quality of the connection, hence to change the connection quality of a datagram to be transferred, so to do a transfer control: and
  said attribute detecting means
    checks at least one of the following items: the Method the HTTP data permits, from Allow included in the HTTP header of a received datagram; the Range requiring method a server permits, from the Accept-Range included in the HTTP header; a host and its port number that requires the HTTP data, from the Host included in the HTTP header; HTTP data getting requirements, from the If-Range included in the HTTP header; the Method a server permits, from the Public included in the HTTP header; and the Range of the HTTP data a user program requires, from the Range included in the HTTP header, as the identifying information.

14. A communication quality control system as claimed in claim 1, in which
  assuming that the layer 3 is an IP, the layer 4 is a TCP, and the layer 5 is an HTTP,
  said attribute detecting means
    checks protocol number of the IP header of the datagram, or the same protocol number and port address within the TCP header of the datagram, or header value next to the IP header of the datagram, or the next header value and port address of the TCP header of the datagram, and knowing that the layer 5 is the HTTP, checks one or some identifying information included in the TCP header, or the TCP header and an HTTP message of the received datagram:
    when the datagram is transferred to a protocol end system, said communication quality deciding means decides quality of a connection of the layer 3 and beneath suitable for a connection derived from the datagram and performs datagram transfer processing based on the quality of the connection, hence to change the connection quality of a datagram to be transferred, so to do a transfer control: and
  said attribute detecting means
    checks at least one of the following items: data length of the datagram, from the Content-Length included in the HTTP header of a received datagram; connection state of the datagram, from the Connection included in the HTTP header; reply information of a server replying to a request of a user program, from the Warning included in the HTTP header; possible date of obtaining the required HTTP data, from the Retry-After included in the HTTP header; the protocol Version, host name and using software name of a gateway or a proxy server relaying packets, from the Via included in the HTTP header; and a coding method of datagrams, from the Transfer-Encoding included in the HTTP header, as the identifying information.

15. A communication quality control system as claimed in claim 1, in which assuming that the layer 3 is an IP, the layer 4 is a TCP or UDP (User Datagram Protocol), said attribute detecting means checks protocol number of the IP header of the datagram or the header value next to the IP header, and knowing that the layer 4 is the TCP or UDP, checks one or some identifying information included in the TCP header or UDP header of the received data as the identifying information, and when the datagram is transferred to a protocol end system, said communication quality deciding means decides quality of a connection of the layer 3 and beneath suitable for a connection derived from the datagram and performs datagram transfer processing based on the quality of the connection, hence to change the connection quality of a datagram to be transferred, so to do a transfer control.

16. A communication quality control system as claimed in claim 1, in which assuming that the layer 3 is an IP, the layer 4 is a TCP or UDP (User Datagram Protocol), said attribute detecting means checks protocol number of the IP header of the datagram or the header value next to the IP header, and knowing that the layer 4 is the TCP or UDP, checks one or some identifying information included in the TCP header or UDP header of the received data as the identifying information:

when the datagram is transferred to a protocol end system, said communication quality deciding means decides quality of a connection of the layer 3 and beneath suitable for a connection derived from the datagram and performs datagram transfer processing based on the quality of the connection, hence to change the connection quality of a datagram to be transferred, so to do a transfer control: and said attributed detecting means checks the "checksum" field included in the UDP header of the received datagram, as the identifying information.

17. A communication quality control system as claimed in claim 1, in which assuming that the layer 3 is an IP, the layer 4 is a TCP or UDP, and the layer 5 is a DNS or TFTP or SNMP, said attribute detecting means checks protocol number of the IP header of the datagram, or the same protocol number and port address within the TCP or UDP protocol header of the datagram, or header value next to the IP header of the datagram, or the next header value and port address of the TCP or UDP protocol header of the datagram, and knowing that the layer 5 is the DNS or TFTP or SNMP, checks one or some identifying information included in the DNS message, the DNS message and the TCP or UDP header, the TFTP message, the UDP header and the TFTP message, the SNMP message, or the UDP header and the SNMP message of the received data as the identifying information, and when the datagram is transferred to a protocol end system, said communication quality deciding means decides quality of a connection of the layer 3 and beneath suitable for a connection derived from the datagram and performs datagram transfer processing based on the quality of the connection, hence to change the connection quality of a datagram to be transferred, so to do a transfer control.

18. A communication quality control system as claimed in claim 1, in which assuming that the layer 3 is an IP, the layer 4 is a TCP or UDP, and the layer 5 is a DNS or TFTP or SNMP, said attribute detecting means checks protocol number of the IP header of the datagram, or the same protocol number and port address within the TCP or UDP protocol header of the datagram, or header value next to the IP header of the datagram, or the next header value and port address of the TCP or UDP protocol header of the datagram, and knowing that the layer 5 is the DNS or TFTP or SNMP, checks one or some identifying information included in the DNS message, the DNS message and the TCP or UDP header, the TFTP message, the UDP header and the TFTP message, the SNMP message, or the UDP header and the SNMP message of the received data as the identifying information:

when the datagram is transferred to a protocol end system, said communication quality deciding means decides quality of a connection of the layer 3 and beneath suitable for a connection derived from the datagram and performs datagram transfer processing based on the quality of the connection, hence to change the connection quality of a datagram to be transferred, so to do a transfer control: and said attribute detecting means checks the presence of the "query type" in the DNS message of the received datagram, as the identifying information.

19. A communication quality control system as claimed in claim 1, in which assuming that the layer 3 is an IP, the layer 4 is a TCP or UDP, and the layer 5 is a DNS or TFTP or SNMP, said attribute detecting means checks protocol number of the IP header of the datagram, or the same protocol number and port address within the TCP or UDP protocol header of the datagram, or header value next to the IP header of the datagram, or the next header value and port address of the TCP or UDP protocol header of the datagram, and knowing that the layer 5 is the DNS or TFTP or SNMP, checks one or some identifying information included in the DNS message, the DNS message and the TCP or UDP header, the TFTP message, the UDP header and the TFTP message, the SNMP message, or the UDP header and the SNMP message of the received data as the identifying information:

when the datagram is transferred to a protocol end system, said communication quality deciding means decides quality of a connection of the layer 3 and beneath suitable for a connection derived from the datagram and performs datagram transfer processing based on the quality of the connection, hence to change the connection quality of a datagram to be transferred, so to do a transfer control: and said attribute detecting means checks "opcode" included in the TFTP message of the received datagram as the identifying information.

20. A communication quality control system as claimed in claim 1, in which assuming that the layer 3 is an IP, the layer 4 is a TCP or UDP, and the layer 5 is a DNS or TFTP or SNMP, said attribute detecting means checks protocol number of the IP header of the datagram, or the same protocol number and port address within the TCP or UDP protocol header of the datagram, or header value next to the IP header of the datagram, or the next header value and port address of the TCP or UDP protocol header of the datagram, and knowing that the layer 5 is the DNS or TFTP or SNMP, checks one or some identifying information included in the DNS message, the DNS message and the TCP or UDP header, the TFTP message, the UDP header and the TFTP message, the SNMP message, or the UDP header and the SNMP message of the received data as the identifying information:

when the datagram is transferred to a protocol end system, said communication quality deciding means decides quality of a connection of the layer 3 and beneath suitable for a connection derived from the datagram and performs datagram transfer processing based on the quality of the connection, hence to change the connection quality of a datagram to be transferred, so to do a transfer control: and said attribute detecting means checks the PDU type included in the SNMP message of the received datagram as the identifying information.

21. A communication quality control system as claimed in claim 1, in which assuming that the layer 3 is an IP, the layer 4 is a TCP, and the layer 5 is an FTP or SNMP, said attribute detecting means checks protocol number of the IP header of the datagram, or the same protocol number and port address within the TCP protocol header of the datagram, or header value next to the IP header of the datagram, or the next header value and port address of the TCP protocol header of the datagram, and knowing that the layer 5 is the FTP or SMTP, checks one or some identifying information included in the FTP Command, the FTP Reply, the TCP header and the FTP Command or FTP Reply, the SMTP Command, SMTP Reply Code, the SMTP header, the TCP header and the SMTP Command or SMTP Reply Code or the SMTP header of the received data as the identifying information, and when the datagram is transferred to a protocol end system, said communication quality deciding means decides quality of a connection of the layer 3 and beneath suitable for a connection derived from the datagram and performs datagram transfer processing based on the quality of the connection, hence to change the connection quality of a datagram to be transferred, so to do a transfer control.

22. A communication quality control system as claimed in claim 1, in which a physical layer of transfer is of the ATM transfer method, individual VCs (Virtual Circuit) are assigned to the respective connection qualities of ATM as the datagram transfer processing according to each connection quality so to transfer datagrams, and parameters for communication quality control depending on the connection qualities are set to the respective VCs, thereby performing transfer depending on the attribute of media derived from a datagram.

23. A communication quality control system as claimed in claim 1, in which said communication quality deciding means sets connection-setting robustness selectively depending on a connection-setting message for setting a connection, in addition to the above communication qualities.

24. A communication quality control system as claimed in claim 1, in which said communication quality deciding means decides at least one of a control parameter relative to an optimum bandwidth, an optimum control parameter relative to delay time including the maximum delay time and the delay time fluctuation amount, an optimum control parameter relative to data loss including buffer amount, a control parameter relative to the optimum accounting information, and a control parameter relative to the optimum security quality, as the communication quality of the connection.

25. A communication quality control system as claimed in claim 1, in which said communication quality deciding means decides at least one of the optimum destination of a datagram and the optimum destination path of a datagram, according to the communication quality of the connection.

26. A communication quality control system as claimed in claim 1, in which said communication quality deciding means according to the communication quality of the connection, transfers the datagram after coding or encoding the same, by use of a physical line of the exclusive use for the connection if necessary, deletes unnecessary information within the datagram, decreases the size of the datagram by compression, and performs tunneling of the datagram.

27. A communication quality control system as claimed in claim 1, in which said communication quality deciding means sets connection-setting priority or connection-transfer priority, as the communication quality of connection, according to the attribute information, and connection-setting processing having the higher connection-setting priority is preferentially executed and a datagram of a connection having the higher connection-transfer priority is preferentially transferred.

28. A communication quality control system for realizing an optimum datagram transfer function for connection quality corresponding to attributes of communication, comprising:

network end systems for respectively terminating a protocol layer of an existent data network;

protocol end systems for respectively terminating the protocol layer 3 and beneath based on quality of communication of a received datagram; and a communication datagram transfer system for transferring the datagram to a specified end system according to quality information of a connection corresponding to communication attributes derived from the information of the respective protocol layers 4, 5, 6, and 7 or one of them included in a datagram received by an arbitrary end system, said communication datagram transfer system including attribute detecting means of checking identifying information included in the information of the respective protocol layers 4, 5, 6, and 7 or one of them included in a datagram received by an arbitrary end system, hence to take out the communication attribute information of the respective protocol layers, and communication quality deciding means for, when a datagram is received by a protocol end system, deciding communication quality for sending the datagram according to a set of the communication attribute information of the respective protocol layers derived from the datagram and the quality information of connection, and notifying the communication quality to said protocol end system.

29. A communication quality control system as claimed in claim 28, in which
said attribute detecting means
identifies the layer information, from the received datagram, as well as the state of a connection from the connection identifying information of a datagram, so to supply the result to said communication quality deciding means as connection information, and decides a transfer path of the datagram, so to supply the transfer path to said communication quality deciding means as destination path information, and
said communication quality deciding means decides quality information of a connection corresponding to the attribute information and decides communication quality for sending a datagram according to the connection information, the quality information of the connection, and the destination path information.

30. A communication quality control system as claimed in claim 28, in which
said attribute detecting means
identifies the layer information, from the received datagram, as well as the state of a connection from the connection identifying information of a datagram, so to supply the result to said communication quality deciding means as connection information, and decides a transfer path of the datagram, so to supply the transfer path to said communication quality deciding means as destination path information, and
said communication quality deciding means decides quality information of a connection corresponding to the attribute information and decides communication quality for sending a datagram according to the connection information, the quality information of the connection, and the destination path information, and
takes out attribute information of communication according to the layer information and one or all of the datagram when it is judged that attributes of the layer 4 and upper need to be detected from the identified state of a connection.

31. A communication quality control system as claimed in claim 28, in which
said attribute detecting means
identifies the layer information, from the received datagram, as well as the state of a connection from the connection identifying information of a datagram, so to supply the result to said communication quality deciding means as connection information, and decides a transfer path of the datagram, so to supply the transfer path to said communication quality deciding means as destination path information:
said communication quality deciding means decides quality information of a connection corresponding to the attribute information and decides communication quality for sending a datagram according to the connection information, the quality information of the connection, and the destination path information:
said communication datagram transfer system
includes a connection/communication quality table in which a set of connection information and communication quality is registered: and
said communication quality deciding means
judges whether the datagram needs to be controlled by said connection-communication quality table when receiving the connection information and the destination path information, or the connection quality information,
checks the presence of the same connection in said connection/communication quality table when the datagram needs to be controlled, and when there is the same connection, said means decides communication quality referring to said connection/communication quality table, while when there is not, said means decides communication quality, according to the connection information, the quality information of a connection, and the destination path information, and stores a set of the connection information and the communication quality into said connection/communication quality table, and
decides communication quality according to the connection information and the destination path information when the datagram doesn't need to be controlled.

32. A communication quality control system as claimed in claim 28, in which
a database for storing the connection quality information corresponding to the attribute information is provided,
said communication quality deciding means decides the connection quality information, according to the attribute information, referring to said database.

33. A communication quality control system as claimed in claim 28, in which
assuming that the layer 3 is an IP, the layer 4 is a TCP, and the layer 5 is an HTTP,
said attribute detecting means
checks protocol number of the IP header of the datagram, or the same protocol number and port address within the TCP protocol header of the datagram, or header value next to the IP header of the datagram, or the next header value and port address of the TCP protocol header of the datagram, and knowing that the layer 5 is the HTTP, checks one or some identifying information included in the TCP header, or the TCP header and an HTTP message of the received datagram, and
when the datagram is transferred to a protocol end system, said communication quality deciding means decides quality of a connection of the layer 3 and beneath suitable for a connection derived from the datagram and performs datagram transfer processing based on the quality of the connection, hence to change the connection quality of a datagram to be transferred, so to do a transfer control.

* * * * *